(12) United States Patent
Sasaki et al.

(10) Patent No.: US 10,134,430 B1
(45) Date of Patent: Nov. 20, 2018

(54) THERMALLY-ASSISTED MAGNETIC RECORDING HEAD INCLUDING A MAIN POLE AND A PLASMON GENERATOR

(71) Applicants: Yoshitaka Sasaki, Los Gatos, CA (US);
Hiroyuki Ito, Milpitas, CA (US);
Hironori Araki, Milpitas, CA (US);
Shigeki Tanemura, Milpitas, CA (US);
Hideo Mamiya, Milpitas, CA (US);
Masakazu Okada, Milpitas, CA (US)

(72) Inventors: Yoshitaka Sasaki, Los Gatos, CA (US);
Hiroyuki Ito, Milpitas, CA (US);
Hironori Araki, Milpitas, CA (US);
Shigeki Tanemura, Milpitas, CA (US);
Hideo Mamiya, Milpitas, CA (US);
Masakazu Okada, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 15/707,277

(22) Filed: Sep. 18, 2017

(51) Int. Cl.
| G11B 5/127 | (2006.01) |
| G11B 5/31 | (2006.01) |
| G11B 5/012 | (2006.01) |
| G11B 7/1387 | (2012.01) |
| G11B 5/60 | (2006.01) |
| G11B 5/00 | (2006.01) |

(52) U.S. Cl.
CPC ............ *G11B 5/3116* (2013.01); *G11B 5/012* (2013.01); *G11B 5/1278* (2013.01); *G11B 5/314* (2013.01); *G11B 5/6088* (2013.01); *G11B 7/1387* (2013.01); *G11B 2005/0005* (2013.01); *G11B 2005/0021* (2013.01)

(58) Field of Classification Search
None
See application file for complete search history.

(56) References Cited

U.S. PATENT DOCUMENTS

| 7,500,255 | B2 * | 3/2009 | Seigler | B82Y 10/00 720/658 |
| 8,107,325 | B2 * | 1/2012 | Komura | G11B 5/314 360/59 |
| 8,374,063 | B2 * | 2/2013 | Tanaka | G11B 5/314 369/112.27 |
| 8,456,968 | B1 * | 6/2013 | Sasaki | G11B 5/3136 369/13.33 |
| 8,929,698 | B2 * | 1/2015 | Peng | G11B 5/6088 216/24 |
| 9,251,830 | B1 * | 2/2016 | Duda | G11B 13/08 |
| 9,472,230 | B1 | 10/2016 | Sasaki et al. | |
| 2011/0170381 | A1 | 7/2011 | Matsumoto | |

FOREIGN PATENT DOCUMENTS

| JP | 2011146097 A | * | 7/2011 | ........... G11B 5/1278 |
| JP | 2013171613 A | * | 9/2013 | ........... G11B 5/3136 |

* cited by examiner

Primary Examiner — William J Klimowicz
(74) Attorney, Agent, or Firm — Oliff PLC

(57) ABSTRACT

A thermally-assisted magnetic recording head includes a main pole, a plasmon generator and a heat sink. The main pole includes a first narrow portion and a first wide portion. The plasmon generator includes a second narrow portion and a second wide portion. The first narrow portion has a first side surface and a second side surface. The second narrow portion has a third side surface and a fourth side surface. The heat sink includes a first portion adjacent to the first side surface and the third side surface, and a second portion adjacent to the second side surface and the fourth side surface.

18 Claims, 35 Drawing Sheets

THERMALLY-ASSISTED MAGNETIC RECORDING HEAD INCLUDING A MAIN POLE AND A PLASMON GENERATOR

BACKGROUND OF THE INVENTION

1. Field of the Invention

The present invention relates to a thermally-assisted magnetic recording head for use in thermally-assisted magnetic recording to write data on a recording medium with the coercivity thereof lowered by applying near-field light thereto.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head unit including a magnetoresistive element (hereinafter, also referred to as MR element) for reading and a write head unit including an induction-type electromagnetic transducer for writing are stacked on a substrate. In a magnetic disk drive, the thin-film magnetic head is mounted on a slider configured to slightly fly above the surface of a recording medium.

To increase the recording density of a magnetic recording device, it is effective to make the magnetic fine particles of the recording medium smaller. Making the magnetic fine particles smaller, however, disadvantageously reduces the thermal stability of magnetization of the magnetic fine particles. To resolve this problem, it is effective to increase the anisotropic energy of the magnetic fine particles. However, increasing the anisotropic energy of the magnetic fine particles leads to an increase in coercivity of the recording medium, thus making it difficult to perform data writing with existing magnetic heads.

To resolve the foregoing problems, there has been proposed a technology called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically guided through a waveguide, which is provided in the slider, to the plasmon generator disposed near the medium facing surface of the slider.

U.S. Patent Application Publication No. 2011/0170381 A1 and U.S. Pat. No. 9,472,230 BI each disclose a thermally-assisted magnetic recording head including a main pole, a waveguide and a plasmon generator. The main pole has an end face located in the medium facing surface, and produces a write magnetic field from this end face. The plasmon generator has an end face located in the medium facing surface. The waveguide includes a core and a cladding. In this head, the surface of the core and the surface of the plasmon generator face each other with a gap interposed therebetween. This head is configured to excite surface plasmons on the plasmon generator by using evanescent light that is generated at the surface of the core from the light propagating through the core, and to generate near-field light from the excited surface plasmons at the end face of the plasmon generator.

To achieve higher recording density, it is necessary to make the track width smaller by reducing at least one of the width of the end face of the plasmon generator in the medium facing surface and the width of the end face of the main pole in the medium facing surface. As the track width is reduced, it becomes more important to bring the end face of the plasmon generator and the end face of the main pole into precise alignment with each other.

In a thermally-assisted magnetic recording head, the plasmon generator and the main pole become hot due to heat generated by the plasmon generator. This can cause the plasmon generator to be deformed or broken, or can degrade the characteristics of the main pole, resulting in a shorter life of the thermally-assisted magnetic recording head. This problem becomes more noticeable with decreases in the width of the end face of the plasmon generator.

U.S. Patent Application Publication No. 2011/0170381 A1 discloses a technique of forming the plasmon generator by etching a metal layer through the use of the main pole or a mask to be used for etching the main pole.

In the thermally-assisted magnetic recording head disclosed in U.S. Pat. No. 9,472,230 B1, the plasmon generator includes a main body, and a front protrusion protruding from the main body. The thermally-assisted magnetic recording head disclosed in U.S. Pat. No. 9,472,230 B1 includes a heat sink provided to be adjacent to the top surface of the main body of the plasmon generator.

However, the conventional thermally-assisted magnetic recording heads with heat sinks are unable to sufficiently dissipate heat from the narrow portion of the plasmon generator in the vicinity of the end face thereof, thus being unable to prevent the aforementioned problem resulting from the heat generated by the plasmon generator.

SUMMARY OF THE INVENTION

It is an object of the present invention to provide a thermally-assisted magnetic recording head and its manufacturing method that enable reduction of the track width and prevention of the problem resulting from the heat generated by a plasmon generator.

A thermally-assisted magnetic recording head of the present invention includes: a medium facing surface configured to face a recording medium; a main pole having a front end face located in the medium facing surface; a waveguide; a plasmon generator; and a heat sink. The waveguide includes a core and a cladding, the core allowing light to propagate therethrough, the cladding being provided around the core. The plasmon generator has a near-field light generating surface located in the medium facing surface, and is configured to excite thereon a surface plasmon resulting from the light propagating through the core, and to generate near-field light from the surface plasmon at the near-field light generating surface.

The main pole includes a first narrow portion including the front end face, and a first wide portion which is located farther from the medium facing surface than is the first narrow portion and is greater than the first narrow portion in dimension in a first direction, the first direction corresponding to the direction of track width. The plasmon generator includes a second narrow portion including the near-field light generating surface, and a second wide portion which is located farther from the medium facing surface than is the second narrow portion and is greater than the second narrow portion in dimension in the first direction. The front end face and the near-field light generating surface are adjacent to each other along a second direction, the second direction corresponding to the direction of track length.

The first narrow portion has a first side surface and a second side surface opposite to each other in the first direction. The second narrow portion has a third side surface and a fourth side surface opposite to each other in the first direction. The heat sink includes a first portion adjacent to the first side surface and the third side surface, and a second portion adjacent to the second side surface and the fourth side surface. Each of the first and second portions is higher in thermal conductivity than the second narrow portion. Each of the first and second portions is at a distance of 10 to 50 nm from the medium facing surface.

In the thermally-assisted magnetic recording head of the present invention, the front end face may have a first edge and a second edge opposite to each other in the first direction, and the near-field light generating surface may have a third edge and a fourth edge opposite to each other in the first direction. The first edge and the third edge are located on a first imaginary straight line extending in the second direction. The second edge and the fourth edge are located on a second imaginary straight line extending in the second direction.

In the thermally-assisted magnetic recording head of the present invention, the heat sink may further include a third portion located on a side of the second narrow portion opposite from the first narrow portion, and adjacent to the second narrow portion. The third portion is higher in thermal conductivity than the second narrow portion. The third portion is at a distance of 10 to 50 nm from the medium facing surface.

The third portion may have an inclined surface facing toward the second narrow portion and the medium facing surface. At least part of the second narrow portion may extend along the inclined surface.

When the third portion has the inclined surface, the first narrow portion may have a first proximal end which is a boundary with the first wide portion, and the first wide portion may have a first end face and a second end face facing toward the medium facing surface. The first proximal end is located between the first end face and the second end face. The second narrow portion may have a second proximal end which is a boundary with the second wide portion, and the second wide portion may have a third end face and a fourth end face facing toward the medium facing surface. The second proximal end may be located between the third end face and the fourth end face.

The first to fourth end faces may be located in one imaginary plane. The one imaginary plane may be inclined with respect to the medium facing surface or substantially parallel to the medium facing surface.

When the heat sink includes the third portion, the plasmon generator may further include an excitation portion located away from the medium facing surface. The excitation portion includes a plasmon exciting portion configured to excite a surface plasmon thereon. Part of the third portion of the heat sink may be interposed between the excitation portion and the second narrow portion.

In the thermally-assisted magnetic recording head of the present invention, the heat sink may further include a fourth portion and a fifth portion. The fourth portion is located between the medium facing surface and the first portion and adjacent to the first side surface. The fifth portion is located between the medium facing surface and the second portion and adjacent to the second side surface.

The fourth portion may be higher in Vickers hardness than the first portion. The fifth portion may be higher in Vickers hardness than the second portion.

In the thermally-assisted magnetic recording head of the present invention, the main pole may further include a third wide portion located on a side of the first narrow portion opposite from the second narrow portion and configured to be magnetically coupled to the first narrow portion. The third wide portion is greater than the first narrow portion in dimension in the first direction.

A manufacturing method for the thermally-assisted magnetic recording head of the present invention includes the steps of: forming the waveguide; forming the plasmon generator and the main pole; and forming the heat sink.

The step of forming the plasmon generator and the main pole includes the steps of: forming an initial plasmon generator layer; patterning the initial plasmon generator layer to provide the initial plasmon generator layer with the second narrow portion and the second wide portion; forming a magnetic layer; and patterning the magnetic layer to provide the magnetic layer with the first narrow portion and the first wide portion. The step of forming the heat sink includes the step of forming the first portion and the second portion after the magnetic layer and the initial plasmon generator layer have been patterned.

The front end face may have a first edge and a second edge opposite to each other in the first direction, and the near-field light generating surface may have a third edge and a fourth edge opposite to each other in the first direction. The first edge and the third edge are located on a first imaginary straight line extending in the second direction. The second edge and the fourth edge are located on a second imaginary straight line extending in the second direction. In such a case, the magnetic layer may be formed after the formation of the initial plasmon generator layer, and the step of patterning the initial plasmon generator layer and the step of patterning the magnetic layer may be performed at the same time.

The heat sink may further include a third portion located on a side of the second narrow portion opposite from the first narrow portion, and adjacent to the second narrow portion. The third portion is higher in thermal conductivity than the second narrow portion. The third portion is at a distance of 10 to 50 nm from the medium facing surface. In such a case, the step of forming the heat sink may further include the step of forming the third portion before the step of forming the initial plasmon generator layer.

The third portion may have an inclined surface facing toward the second narrow portion and the medium facing surface. In such a case, at least part of the initial plasmon generator layer may be formed on the inclined surface.

The plasmon generator may further include an excitation portion located away from the medium facing surface. The excitation portion includes a plasmon exciting portion configured to excite a surface plasmon thereon. Part of the third portion of the heat sink may be interposed between the excitation portion and the second narrow portion. In such a case, the step of forming the plasmon generator and the main pole further includes the step of forming the excitation portion before the step of forming the third portion.

The heat sink may further include a fourth portion and a fifth portion. The fourth portion is located between the medium facing surface and the first portion and adjacent to the first side surface. The fifth portion is located between the medium facing surface and the second portion and adjacent to the second side surface. In such a case, the step of forming the heat sink further includes the step of forming the fourth portion and the fifth portion after the step of forming the first portion and the second portion.

According to the present invention, the first narrow portion of the main pole has the first side surface and the second side surface, and the second narrow portion of the plasmon generator has the third side surface and the fourth side surface. The heat sink includes the first portion adjacent to the first side surface and the third side surface, and the second portion adjacent to the second side surface and the fourth side surface. By virtue of this, the present invention achieves a small track width and enables prevention of the problem resulting from heat generated by the plasmon generator.

Other and further objects, features and advantages of the present invention will appear more fully from the following description.

DETAILED DESCRIPTION OF THE PREFERRED EMBODIMENTS

First Embodiment

Figure 5:
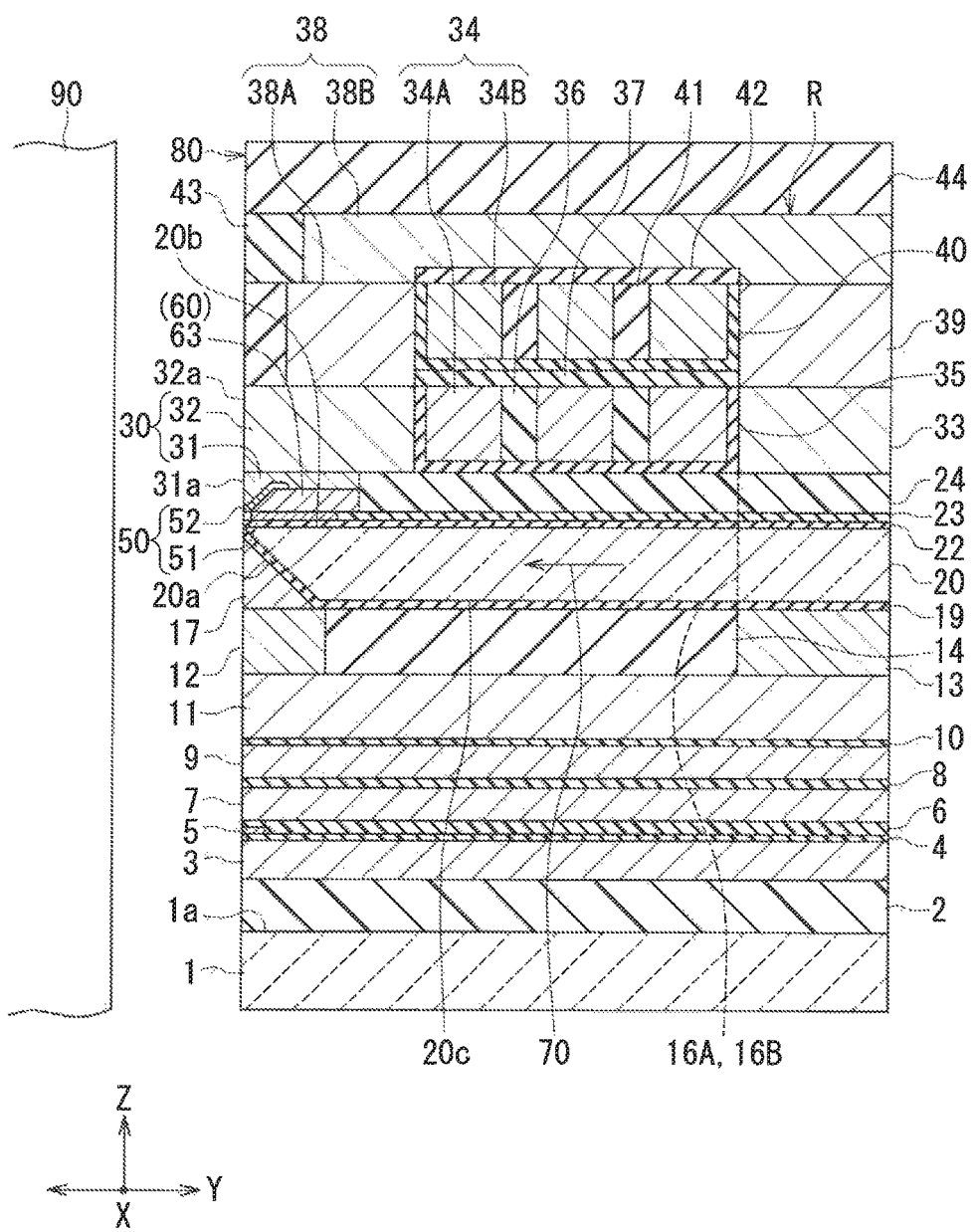
FIG. 5 is a cross-sectional view showing the configuration of the thermally-assisted magnetic recording head according to the first embodiment of the invention.
Figure 6:
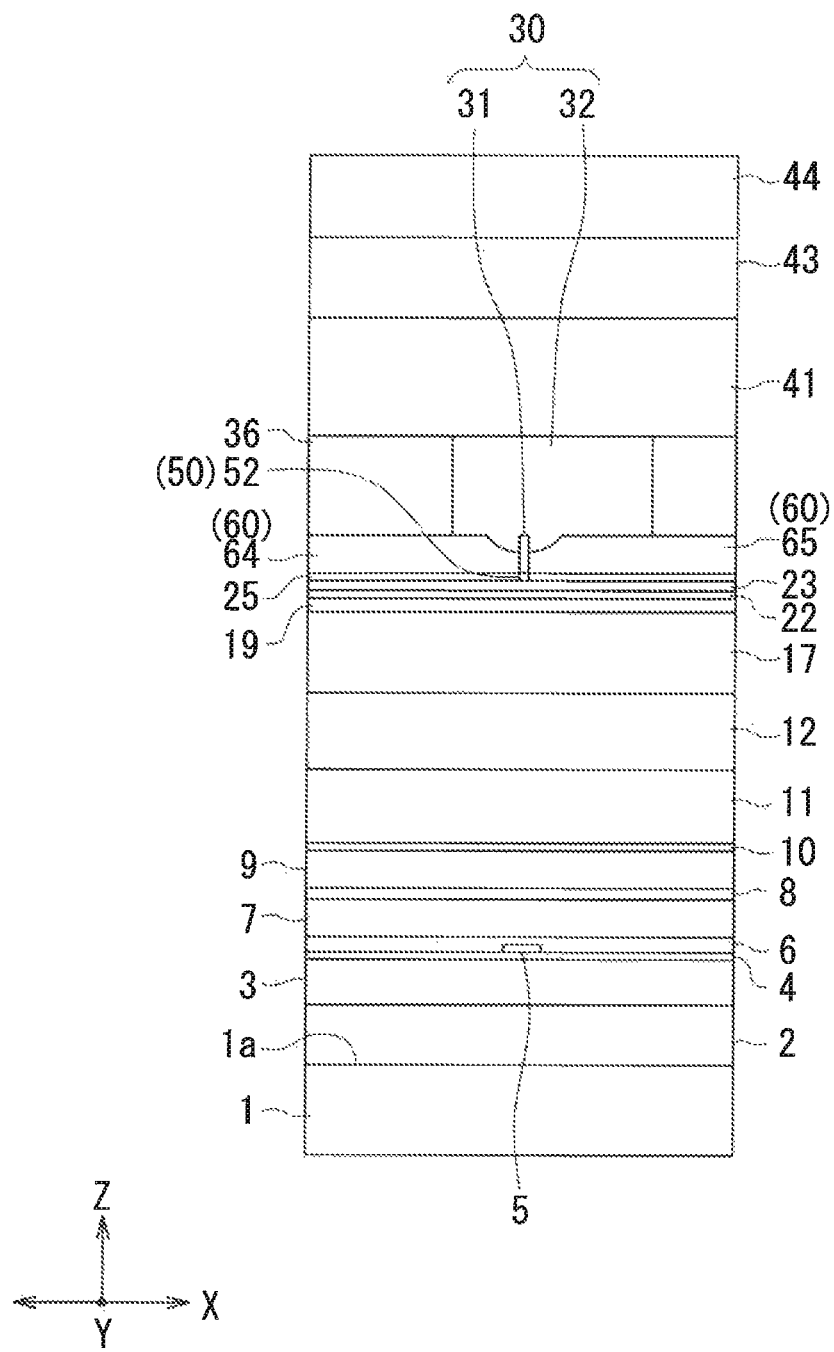
FIG. 6 is a front view showing the medium facing surface of the thermally-assisted magnetic recording head according to the first embodiment of the invention.

Preferred embodiments of the present invention will now be described in detail with reference to the drawings. First, reference is made to FIG. 5 and FIG. 6 to describe the configuration of a thermally-assisted magnetic recording head according to a first embodiment of the invention. FIG. 5 is a cross-sectional view showing the configuration of the thermally-assisted magnetic recording head. FIG. 6 is a front view showing the medium facing surface of the thermally-assisted magnetic recording head.

The thermally-assisted magnetic recording head according to the present embodiment is intended for use in perpendicular magnetic recording, and is incorporated in a slider configured to fly over the surface of a rotating recording medium. The slider has a medium facing surface 80 configured to face a recording medium 90. When the recording medium 90 rotates, an airflow passing between the recording medium 90 and the slider causes a lift to be exerted on the slider. The lift causes the slider to fly over the surface of the recording medium 90.

As shown in FIG. 5, the thermally-assisted magnetic recording head has the medium facing surface 80. Here, we define X direction, Y direction, and Z direction as follows. The X direction corresponds to the direction of track width of the recording medium 90. The Y direction is a direction perpendicular to the medium facing surface 80. The Z direction corresponds to the direction of track length of the recording medium 90, and is the direction of travel of the recording medium 90 as viewed from the slider. The X, Y, and Z directions are orthogonal to one another. The X direction corresponds to the first direction in the present invention. The Z direction corresponds to the second direction in the present invention.

As shown in FIG. 5 and FIG. 6, the thermally-assisted magnetic recording head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a bottom shield layer 3 formed of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not illustrated) connected to the MR element 5; a top shield gap film 6 which is an insulating film disposed on the MR element 5; and a top shield layer 7 formed of a magnetic material and disposed on the top shield gap film 6. The Z direction is also a direction perpendicular to the top surface 1a of the substrate 1.

For the positions of components of the thermally-assisted magnetic recording head, the term "above" as used herein refers to positions located in a direction that is parallel to the Z direction and away from the top surface 1a with respect to a reference position, and "below" refers to positions located in a direction that is parallel to the Z direction and toward the top surface 1a with respect to the reference position. For the surfaces of the components of the thermally-assisted magnetic recording head, the term "top surface" as used herein refers to the surface farthest from the top surface 1a, and "bottom surface" refers to the surface closest to the top surface 1a.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the bottom shield layer 3 to the top shield layer 7 constitute a read head unit. The thermally-assisted magnetic recording head further includes an insulating layer 8 disposed on the top shield layer 7, a middle shield layer 9 formed of a magnetic material and disposed on the insulating layer 8, a nonmagnetic layer 10 formed of a nonmagnetic material and disposed on the middle shield layer 9, and a write head unit disposed on the nonmagnetic layer 10. The middle shield layer 9 has the function of shielding the MR element 5 from magnetic fields generated in the write head unit. The insulating layer 8 and the nonmagnetic layer 10 are formed of alumina, for example.

The write head unit includes a coil 34, and a main pole 30 formed of a magnetic material. The coil 34 produces a magnetic field corresponding to data to be written on the recording medium 90. The main pole 30 includes a first layer 31 and a second layer 32. The first layer 31 has a front end face 31a located in the medium facing surface 80. The second layer 32 has an end face 32a located in the medium facing surface 80. The main pole 30 is configured to pass a magnetic flux corresponding to the magnetic field produced by the coil 34, and to produce from the front end face 31a a write magnetic field for use to write data on the recording medium 90 by means of a perpendicular magnetic recording system. The coil 34 is formed of a conductive material such as copper.

The write head unit further includes a shield 17. The shield 17 is formed of a magnetic metal. The shield 17 has an end face located in the medium facing surface 80.

The write head unit further includes a return path section R formed of a magnetic material. The return path section R connects the main pole 30 and the shield 17 to each other, and passes a magnetic flux corresponding to the magnetic field produced by the coil 34. The return path section R includes a return pole layer 11, coupling layers 12, 13, 33 and 39, two coupling sections 16A and 16B, and a yoke portion 38. The return pole layer 11 lies on the nonmagnetic layer 10. The return pole layer 11 has an end face located in the medium facing surface 80. The write head unit further includes a non-illustrated insulating layer provided around the return pole layer 11. The non-illustrated insulating layer is formed of alumina, for example.

The coupling layer 12 lies on a first portion of the top surface of the return pole layer 11, the first portion being near the medium facing surface 80. The coupling layer 13 lies on a second portion of the top surface of the return pole layer 11, the second portion being located away from the medium facing surface 80. The coupling layer 12 has an end face located in the medium facing surface 80. The write head unit further includes an insulating layer 14 lying on the non-illustrated insulating layer and a portion of the top surface of the return pole layer 11 other than the first and second portions. The insulating layer 14 is formed of alumina, for example.

The shield 17 is disposed on the coupling layer 12. The coupling sections 16A and 16B are disposed on the coupling layer 13. Each of the coupling sections 16A and 16B includes a first layer lying on the coupling layer 13, and a second layer lying on the first layer. The first layer of the coupling section 16A and the first layer of the coupling section 16B are aligned in the direction of track width (the X direction).

The write head unit further includes a waveguide including a core 20 and a cladding, the core 20 allowing light to propagate therethrough, the cladding being provided around the core 20. The core 20 has an end face 20a facing toward the medium facing surface 80, an evanescent light generating surface 20b which is a top surface, a bottom surface 20c, and two side surfaces. The end face 20a is inclined such that the distance between the medium facing surface 80 and the end face 20a decreases with increasing distance between the end face 20a and the top surface 1a of the substrate 1.

The cladding includes a bottom cladding layer 19, a top cladding layer 22, and a surrounding cladding layer (not illustrated). The bottom cladding layer 19 lies on the coupling layer 13 and the insulating layer 14. The core 20 lies on the bottom cladding layer 19. The surrounding cladding layer lies on the bottom cladding layer 19 and surrounds the core 20. The top cladding layer 22 lies on the evanescent light generating surface 20b of the core 20 and the top surface of the surrounding cladding layer.

The core 20 is formed of a dielectric material that transmits laser light to be used for generating near-field light. The laser light emitted from a non-illustrated laser diode enters the core 20 and propagates through the core 20. The cladding is formed of a dielectric material that has a refractive index lower than that of the core 20. For example, the core 20 may be formed of tantalum oxide such as $Ta_2O_5$ or silicon oxynitride (SiON), whereas the cladding may be formed of silicon oxide ($SiO_2$) or alumina.

The first layers of the coupling sections 16A and 16B are embedded in the bottom cladding layer 19 and the surrounding cladding layer. The first layer of the coupling section 16A and the first layer of the coupling section 16B are located on opposite sides of the core 20 in the direction of track width (the X direction) and spaced from the core 20.

The write head unit further includes a plasmon generator 50 and a heat sink 60. The plasmon generator 50 is configured to excite surface plasmons thereon on the principle to be described later. As will be described in detail later, the plasmon generator 50 includes an excitation portion and an emission portion 52. The excitation portion 51 is located away from the medium facing surface 80. The emission portion 52 has a near-field light generating surface 52a located in the medium facing surface 80. The plasmon generator 50 is configured to excite thereon surface plasmons resulting from the light propagating through the core 20, and to generate near-field light from the surface plasmons at the near-field light generating surface 52a.

As will be described in detail later, the heat sink 60 includes a first portion 61, a second portion 62, a third portion 63, a fourth portion 64, and a fifth portion 65. FIG. 5 shows the third portion 63. FIG. 6 shows the fourth portion 64 and the fifth portion 65. Neither of the first and second portions 61 and 62 appears in FIG. 5 or FIG. 6.

The plasmon generator 50, the heat sink 60 and the first layer 31 of the main pole 30 constitute a structure.

The write head unit further includes dielectric layers 23 and 24 disposed around the structure and stacked in this order on the top cladding layer 22. The dielectric layers 23 and 24 are formed of the same material as the cladding, for example.

The second layers of the coupling sections 16A and 16B are embedded in the top cladding layer 22 and the dielectric layers 23 and 24. The coupling layer 33 lies on the second layers of the coupling sections 16A and 16B and the dielectric layer 24.

The write head unit further includes a dielectric layer 25 disposed around the plasmon generator 50 in the vicinity of the medium facing surface 80.

The coil 34 includes a first layer 34A and a second layer 34B connected in series. The first layer 34A is wound around the coupling layer 33. The write head unit further includes: an insulating film 35 for separating the first layer 34A from the second layer 32 of the main pole 30 and the coupling layer 33; an insulating layer 36 disposed around the second layer 32 and in the space between adjacent turns of the first layer 34A; and an insulating layer 37 lying on the first layer 34A, the insulating film 35 and the insulating layer 36. The insulating film 35 and the insulating layers 36 and 37 are formed of alumina, for example.

The yoke portion 38 includes a first layer 38A and a second layer 38B. The first layer 38A lies on the second layer 32 of the main pole 30. The first layer 38A has an end face facing toward the medium facing surface 80. This end face of the first layer 38A is located at a distance from the medium facing surface 80. The coupling layer 39 lies on the coupling layer 33.

The second layer 34B of the coil 34 lies above the first layer 34A. The second layer 34B is wound around the coupling layer 39. The write head unit further includes: an insulating film 40 for separating the second layer 34B from the insulating layer 37, the first layer 38A of the yoke portion 38 and the coupling layer 39; an insulating layer 41 disposed around the first layer 38A and in the space between adjacent turns of the second layer 34B; and an insulating layer 42 lying on the second layer 34B, the insulating film 40 and the insulating layer 41. The insulating film 40 and the insulating layers 41 and 42 are formed of alumina, for example.

The second layer 38B of the yoke portion 38 lies on the first layer 38A, the coupling layer 39 and the insulating layer 42. The second layer 38B has an end face facing toward the medium facing surface 80. This end face of the second layer 38B is located at a distance from the medium facing surface 80. The write head unit further includes an insulating layer 43 disposed around the second layer 38B. The insulating layer 43 is formed of alumina, for example.

The thermally-assisted magnetic recording head further includes a protective layer 44 disposed to cover the write head unit. The protective layer 44 is formed of alumina, for example.

As has been described, the thermally-assisted magnetic recording head according to the present embodiment includes the medium facing surface 80, the read head unit, and the write head unit. The read head unit and the write head unit are stacked on the substrate 1. The write head unit is located on the trailing side, i.e., the front side in the direction of travel of the recording medium 90 (the Z direction), relative to the read head unit.

The write head unit includes the coil 34, the main pole 30, the waveguide, the plasmon generator 50, the head sink 60, the shield 17, and the return path section R. The plasmon generator 50 and the main pole 30 are located on the front side in the direction of travel of the recording medium 90 relative to the core 20 of the waveguide.

The shield 17 and the return path section R have the function of allowing a magnetic flux that has been produced from the front end face 31a of the first layer 31 of the main pole 30 and has magnetized a portion of the recording medium 90 to flow back to the main pole 30.

Figure 1:
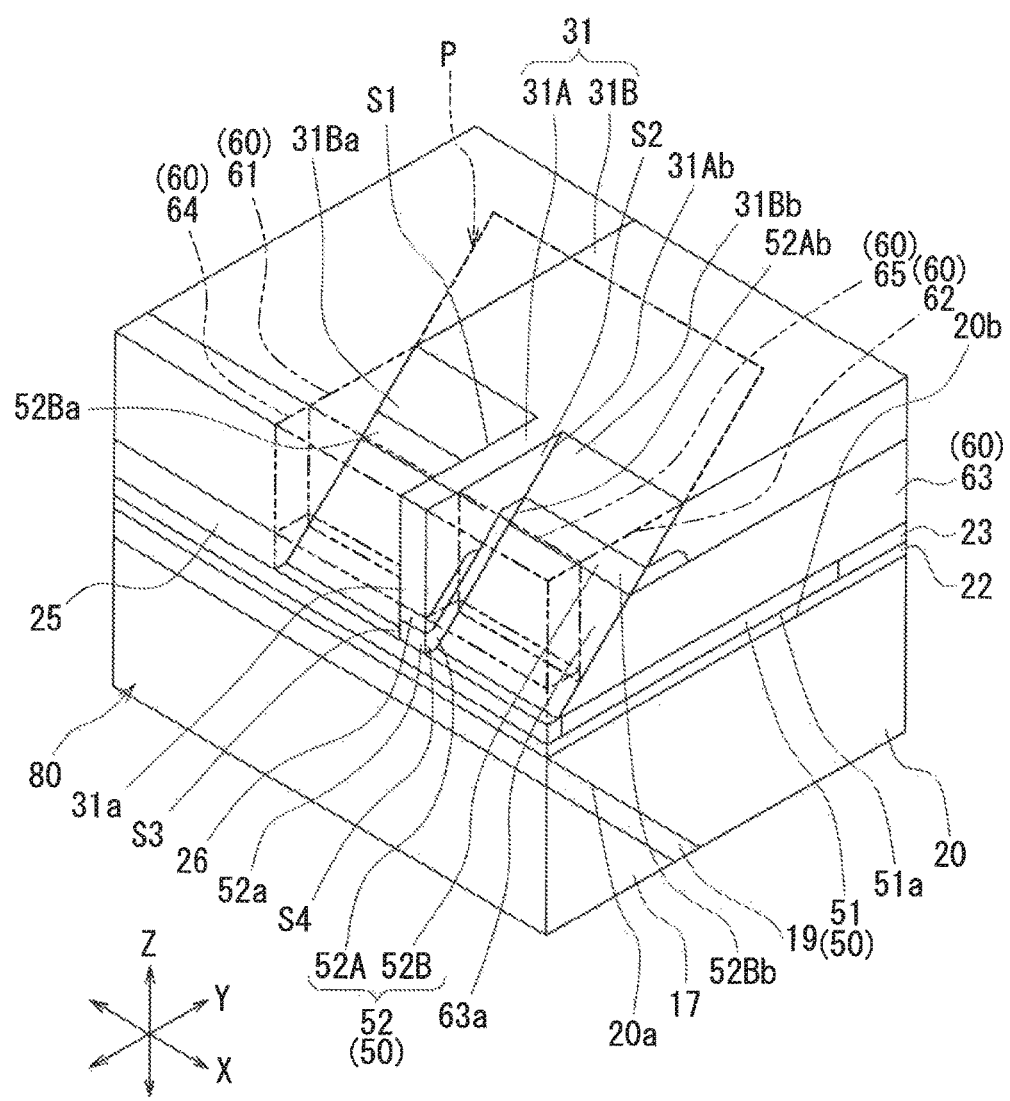
FIG. 1 is a perspective view showing the main part of a thermally-assisted magnetic recording head according to a first embodiment of the invention.
Figure 2:
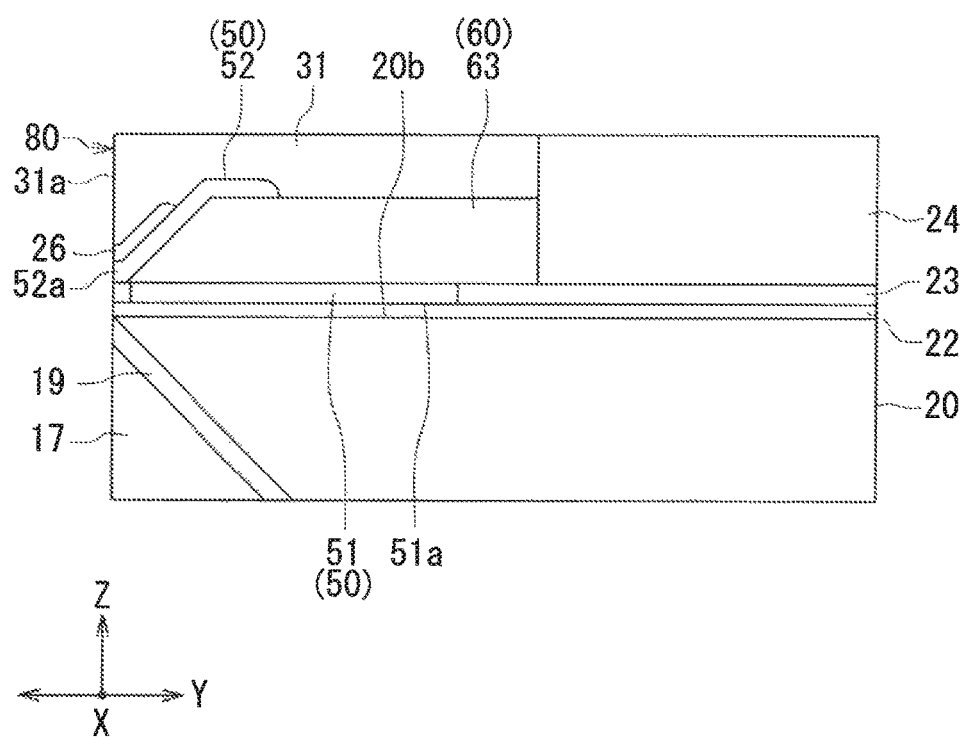
FIG. 2 is a cross-sectional view showing the main part of the thermally-assisted magnetic recording head according to the first embodiment of the invention.
Figure 3:
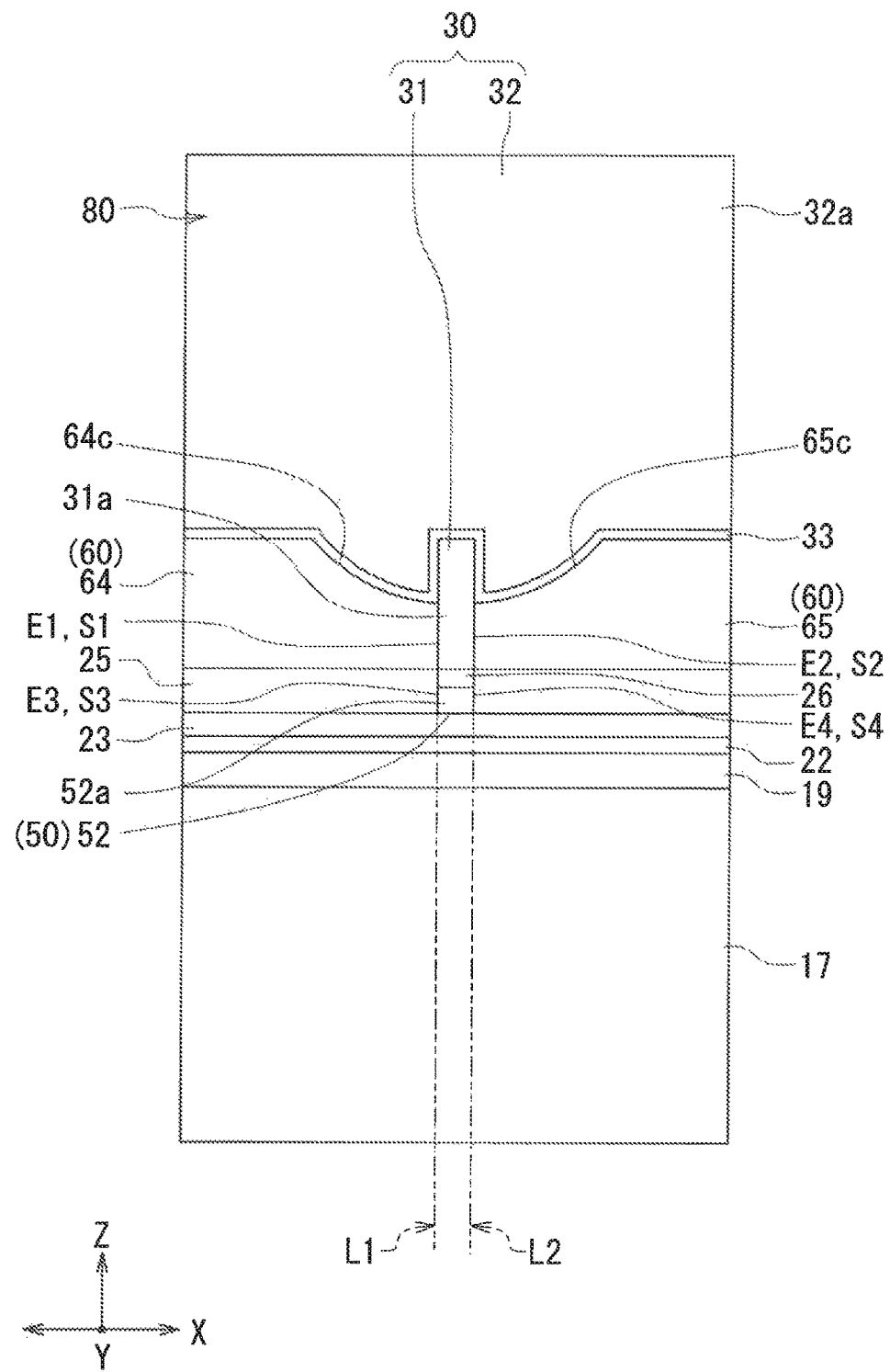
FIG. 3 is a front view showing the main part of the thermally-assisted magnetic recording head according to the first embodiment of the invention.
Figure 4:
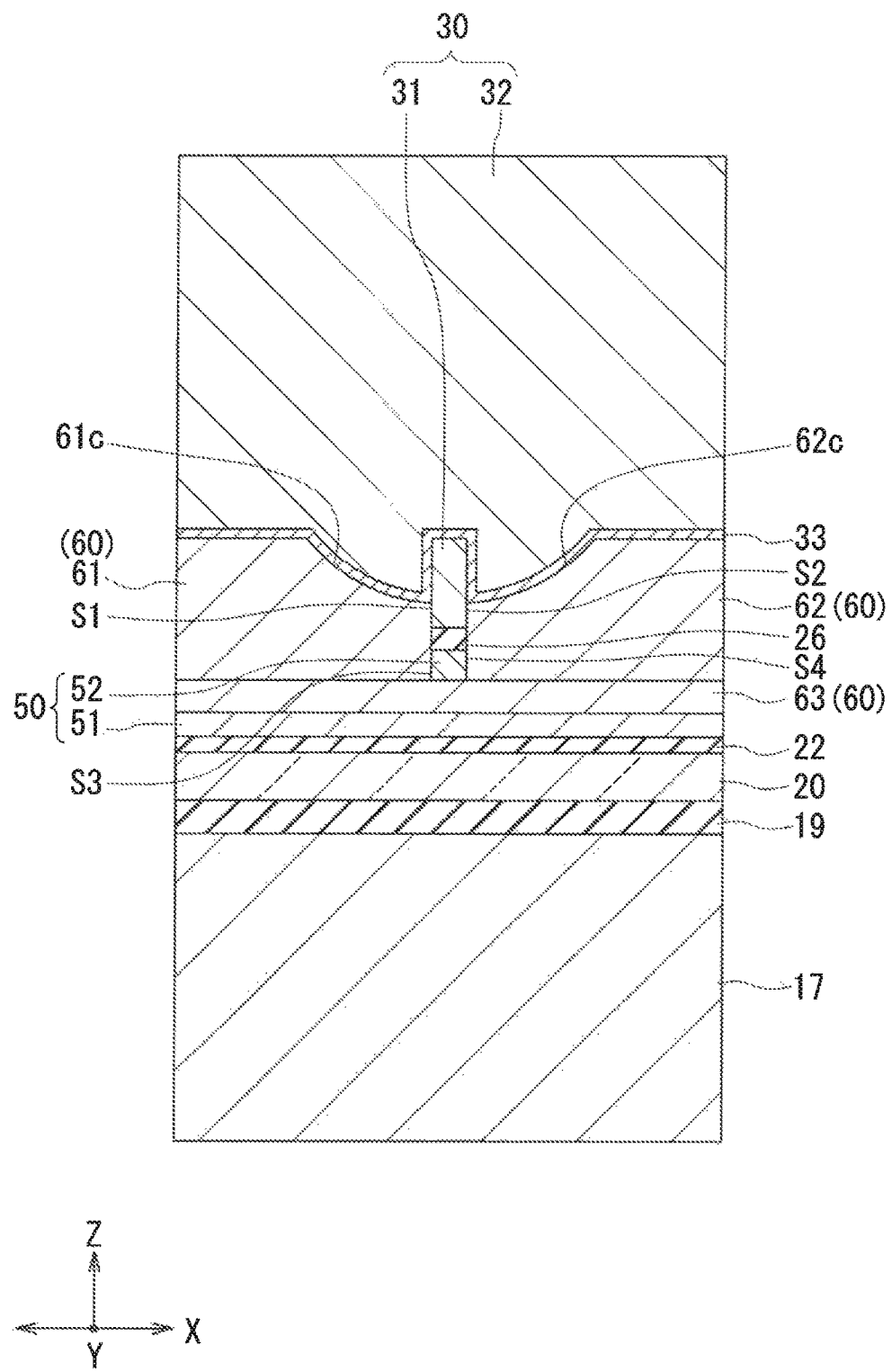
FIG. 4 is another cross-sectional view showing the main part of the thermally-assisted magnetic recording head according to the first embodiment of the invention.

The main pole 30, the plasmon generator 50 and the heat sink 60 will now be described in detail with reference to FIG. 1 to FIG. 4. FIG. 1 is a perspective view showing the main part of the thermally-assisted magnetic recording head. FIG. 2 is a cross-sectional view showing the main part of the thermally-assisted magnetic recording head. FIG. 3 is a front view showing the main part of the thermally-assisted magnetic recording head. FIG. 4 is another cross-sectional view showing the main part of the thermally-assisted magnetic recording head. FIGS. 1 to 4 also show the X, Y and Z directions mentioned previously.

As shown in FIG. 1, the first layer 31 of the main pole 30 includes a first narrow portion 31A including the front end face 31a, and a first wide portion 31B which is located farther from the medium facing surface 80 than is the first narrow portion 31A and is greater than the first narrow portion 31A in dimension in the X direction.

The excitation portion 51 of the plasmon generator 50 lies on the top cladding layer 22. The dielectric layer 23 is disposed around the excitation portion 51. The excitation portion 51 has a front end closest to the medium facing surface 80. The distance between the medium facing surface 80 and the front end falls within the range of 10 to 50 nm.

The excitation portion 51 is formed of a metal material suitable for excitation and propagation of surface plasmons. The excitation portion 51 may contain one of Au, Cu, Ag, and Al.

The excitation portion 51 includes a plasmon exciting portion 51a configured to excite surface plasmons thereon. The plasmon exciting portion 51a is located at a predetermined distance from the evanescent light generating surface 20b of the core 20 and faces the evanescent light generating surface 20b. The top cladding layer 22 is interposed between the evanescent light generating surface 20b and the plasmon exciting portion 51a.

The emission portion 52 of the plasmon generator 50 includes a second narrow portion 52A including the near-field light generating surface 52a, and a second wide portion 52B which is located farther from the medium facing surface 80 than is the second narrow portion 52A and is greater than the second narrow portion 52A in dimension in the X direction. The emission portion 52 is formed of a metal material having a Vickers hardness higher than that of the metal material used to form the excitation portion 51. The emission portion 52 may contain one of Rh, Ir, Ru, and Pt.

The front end face 31a and the near-field light generating surface 52a are aligned along the Z direction. The front end face 31a is located on the trailing side, i.e., the front side in the direction of travel of the recording medium 90 (the Z direction) relative to the near-field light generating surface 52a.

The write head unit includes a dielectric layer 26 interposed between the first narrow portion 31A and the second narrow portion 52A. The dielectric layer 26 has an end face located in the medium facing surface 80. The end face is interposed between the front end face 31a and the near-field light generating surface 52a. The dielectric layer 26 is formed of the same material as the cladding, for example.

The second layer 32 of the main pole 30 is located on a side of the first narrow portion 31A opposite form the second narrow portion 52A, and configured to be magnetically coupled to the first narrow portion 31A. The second layer 32 is greater than the first narrow portion 31A in dimension in the X direction. The second layer 32 corresponds to the third wide portion in the present invention.

As shown in FIG. 3, the front end face 31a has a first edge E1 and a second edge E2 opposite to each other in the X direction. The near-field light generating surface 52a has a third edge E3 and a fourth edge E4 opposite to each other in the X direction. The first edge E1 and the third edge E3 are located on a first imaginary straight line L1 extending in the Z direction. The second edge E2 and the fourth edge E4 are located on a second imaginary straight line L2 extending in the Z direction.

The first narrow portion 31A has a first side surface S1 and a second side surface S2 opposite to each other in the X direction. The second narrow portion 52A has a third side surface S3 and a fourth side surface S4 opposite to each other in the X direction.

The distance between the first side surface S1 and the second side surface S2 in the X direction may be constant regardless of distance from the medium facing surface 80, or may increase with increasing distance from the medium facing surface 80.

Likewise, the distance between the third side surface S3 and the fourth side surface S4 in the X direction may be constant regardless of distance from the medium facing surface 80, or may increase with increasing distance from the medium facing surface 80.

As mentioned previously, the heat sink 60 includes the first portion 61, the second portion 62, the third portion 63, the fourth portion 64, and the fifth portion 65. Each of the first to fifth portions 61 to 65 is formed of metal material, for example.

FIG. 4 shows a cross section intersecting the first and second portions 61 and 62 and parallel to the medium facing surface 80.

The first portion 61 is adjacent to the first and third side surfaces S1 and S3. The first portion 61 may be in contact with the first and third side surfaces S1 and S3 or may be adjacent to the first and third side surfaces S1 and S3 with a thin film, such as a diffusion-preventing film, interposed between the first portion 61 and the first and third side surfaces S1 and S3. The distance between the first portion 61 and each of the first and third side surfaces S1 and S3 is preferably 2 nm or less.

The second portion 62 is adjacent to the second and fourth side surfaces S2 and S4. The second portion 62 may be in contact with the second and fourth side surfaces S2 and S4 or may be adjacent to the second and fourth side surfaces S2 and S4 with a thin film, such as a diffusion-preventing film, interposed between the second portion 62 and the second and fourth side surfaces S2 and S4. The distance between the second portion 62 and each of the second and fourth side surfaces S2 and S4 is preferably 2 nm or less.

The first and second portions 61 and 62 are each higher in thermal conductivity than the second narrow portion 52A. Each of the first and second portions 61 and 62 may contain one of Au, Cu, Ag, and Al. Each of the first and second portions 61 and 62 is at a distance of 10 to 50 nm from the medium facing surface 80.

The third portion 63 lies on the excitation portion 51 of the plasmon generator 50 and the dielectric layer 23. The third portion 63 has an inclined surface 63a facing toward the second narrow portion 52A and the medium facing surface 80. At least part of the second narrow portion 52A extends along the inclined surface 63a. The at least part of the second narrow portion 52A may be in contact with the inclined surface 63a or adjacent to the inclined surface 63a with a thin film interposed therebetween. The distance between the at least part of the second narrow portion 52A and the inclined surface 63a is preferably 2 nm or less.

The third portion 63 is higher in thermal conductivity than the second narrow portion 52A. The third portion 63 may contain one of Au, Cu, Ag, and Al. The third portion 63 is at a distance of 10 to 50 nm from the medium facing surface 80. The distance between the medium facing surface 80 and the third portion 63 may be equal to or slightly different from the distance between the medium facing surface 80 and the front end of the excitation portion 51.

As shown in FIG. 1, the first narrow portion 31A has a first proximal end 31Ab which is a boundary with the first wide portion 31B. The first wide portion 31B has a first end face 31Ba and a second end face 31Bb facing toward the medium facing surface 80. The first proximal end 31Ab is located between the first end face 31Ba and the second end face 31Bb.

The second narrow portion 52A has a second proximal end 52Ab which is a boundary with the second wide portion 52B. The second wide portion 52B has a third end face 52Ba and a fourth end face 52Bb facing toward the medium facing surface 80. The second proximal end 52Ab is located between the third end face 52Ba and the fourth end face 52Bb.

The first to fourth end faces 31Ba, 31Bb, 52Ba, and 52Bb are located in one imaginary plane P. The imaginary plane P is inclined with respect to the medium facing surface 80.

The imaginary plane P may or may not include the inclined surface 63a of the third portion 63. FIG. 1 illustrates an example of the imaginary plane P that includes the inclined surface 63a. Another example of the imaginary plane P that does not include the inclined surface 63a will be described later.

Part of the third portion 63 is interposed between the excitation portion 51 and the second narrow portion 52A of the plasmon generator 50.

The fourth portion 64 is located between the medium facing surface 80 and the first portion 61 and is adjacent to the first side surface S1. The fourth portion 64 is not adjacent to the third side surface S3. The fourth portion 64 may be in contact with the first side surface S1 or may be adjacent to the first side surface S1 with a thin film, such as a diffusion-preventing film, interposed therebetween. The distance between the fourth portion 64 and the first side surface S1 is preferably 2 nm or less.

The fifth portion 65 is located between the medium facing surface 80 and the second portion 62 and is adjacent to the second side surface S2. The fifth portion 65 is not adjacent to the fourth side surface S4. The fifth portion 65 may be in contact with the second side surface S2 or may be adjacent to the second side surface S2 with a thin film, such as a diffusion-preventing film, interposed therebetween. The distance between the fifth portion 65 and the second side surface S2 is preferably 2 nm or less.

Each of the fourth and fifth portions 64 and 65 has an end face located in the medium facing surface 80. The fourth portion 64 is preferably higher in Vickers hardness than the first portion 61. The fifth portion 65 is preferably higher in Vickers hardness than the second portion 62. In such cases, each of the fourth and fifth portions 64 and 65 may contain one of Rh, Ir, Ru, and Pt.

Like the first and second portions 61 and 62, the fourth and fifth portions 64 and 65 may be higher in thermal conductivity than the second narrow portion 52A. In such a case, each of the fourth and fifth portions 64 and 65 may contain one of Au, Cu, Ag, and Al.

As shown in FIGS. 3 and 4, the first portion 61, the second portion 62, the fourth portion 64 and the fifth portion 65 respectively have recesses 61c, 62c, 64c and 65c for accommodating a protrusion of the second layer 32 of the main pole 30. However, the recesses 61c, 62c, 64c and 65c can be omitted. For the sake of convenience, FIG. 1 does not show those recesses.

FIGS. 3 and 4 shows an example in which a diffusion-preventing film 33 formed of, e.g., Ru, is interposed between the second layer 32 and each of the first portion 61, the second portion 62, the fourth portion 64, the fifth portion 65 and the first layer 31. However, the diffusion-preventing film 33 can be omitted. The second layer 32 magnetically couples to the first layer 31 even in the presence of the diffusion-preventing film 33 between the first layer 31 and the second layer 32.

Now, the principle of generation of near-field light in the present embodiment and the principle of thermally-assisted magnetic recording using near-field light will be described in detail. Laser light emitted from a laser diode (not illustrated) enters the core 20. As shown in FIG. 5, the laser light 70 propagates through the core 20 toward the medium facing surface 80 and reaches the vicinity of the excitation portion 51 of the plasmon generator 50. The evanescent light generating surface 20b of the core 20 generates evanescent light from the laser light 70 propagating through the core 20. More specifically, the laser light 70 is totally reflected at the evanescent light generating surface 20b, and this causes the evanescent light generating surface 20b to generate evanescent light permeating into the top cladding layer 22. In the plasmon generator 50, surface plasmons are excited on the plasmon exciting portion 51a of the excitation portion 51 through coupling with the aforementioned evanescent light. The excited surface plasmons propagate to the near-field light generating surface 52a through the excitation portion 51 and the emission portion 52. The emission portion 52 generates near-field light from those surface plasmons at the near-field light generating surface 52a.

The near-field light generated at the near-field light generating surface 52a is projected toward the recording medium 90, reaches the surface of the recording medium 90 and heats a portion of the magnetic recording layer of the recording medium 90. This lowers the coercivity of the portion of the magnetic recording layer. In thermally-assisted magnetic recording, the portion of the magnetic recording layer with the lowered coercivity is subjected to a write magnetic field produced by the front end face 31a of the first layer 31 of the main pole 30 for data writing.

A method of manufacturing the thermally-assisted magnetic recording head according to the present embodiment will now be described. The method of manufacturing the thermally-assisted magnetic recording head includes the steps of: forming components of a plurality of thermally-assisted magnetic recording heads, except the substrates 1, on a wafer that includes portions to become the substrates 1 of the plurality of thermally-assisted magnetic recording heads, thereby fabricating a substructure including a plurality of pre-head portions arranged in rows, the plurality of pre-head portions becoming individual thermally-assisted magnetic recording heads later, and cutting the substructure to separate the plurality of pre-head portions from each other and forming the medium facing surface 80 for each of the plurality of pre-head portions (this step will be referred to as the step of forming the medium facing surface 80). A plurality of thermally-assisted magnetic recording heads are produced in this manner.

The method of manufacturing the thermally-assisted magnetic recording head according to the present embodiment will be described in more detail below with attention focused on a single thermally-assisted magnetic recording head. The method of manufacturing the thermally-assisted magnetic recording head starts with forming the insulating layer 2, the bottom shield layer 3, and the bottom shield gap film 4 in this order on the substrate 1. Then, the MR element 5 and two leads (not illustrated) connected to the MR element 5 are formed on the bottom shield gap film 4. The top shield gap film 6 is then formed to cover the MR element 5 and the leads. Next, the top shield layer 7, the insulating layer 8, the middle shield layer 9, and the nonmagnetic layer 10 are formed in this order on the top shield gap film 6.

The return pole layer 11 is then formed on the nonmagnetic layer 10. Next, a non-illustrated insulating layer is formed to cover the return pole layer 11. The non-illustrated insulating layer is then polished by, for example, chemical mechanical polishing (hereinafter referred to as CMP), until the return pole layer 11 is exposed. Next, the coupling layers 12 and 13 are formed on the return pole layer 11. Then, the insulating layer 14 is formed over the entire top surface of the stack. The insulating layer 14 is then polished by, for example, CMP, until the coupling layers 12 and 13 are exposed.

The shield 17 is then formed on the coupling layer 12. Next, the bottom cladding layer 19 is formed over the entire top surface of the stack. The bottom cladding layer 19 is then selectively etched to form therein two openings for exposing the top surface of the coupling layer 13. Next, the first layers of the coupling sections 16A and 16B are formed on the coupling layer 13 at the locations of the two openings. The core 20 is then formed on the bottom cladding layer 19. Next, the surrounding cladding layer is formed over the entire top surface of the stack. The surrounding cladding layer is then polished by, for example, CMP until the core 20 and the first layers of the coupling sections 16A and 16B are exposed. Then, the top cladding layer 22 is formed over the entire top surface of the stack.

Reference is now made to FIGS. 7A to 22C to describe steps to be performed after the formation of the top cladding layer 22 up to the formation of an initial main pole which will become the main pole 30 later. FIGS. 7A to 22C each show a stack of layers formed in the process of manufacturing the thermally-assisted magnetic recording head. Some of these figures illustrate the location ABS at which the medium facing surface 80 is to be formed.

Figure 7A:
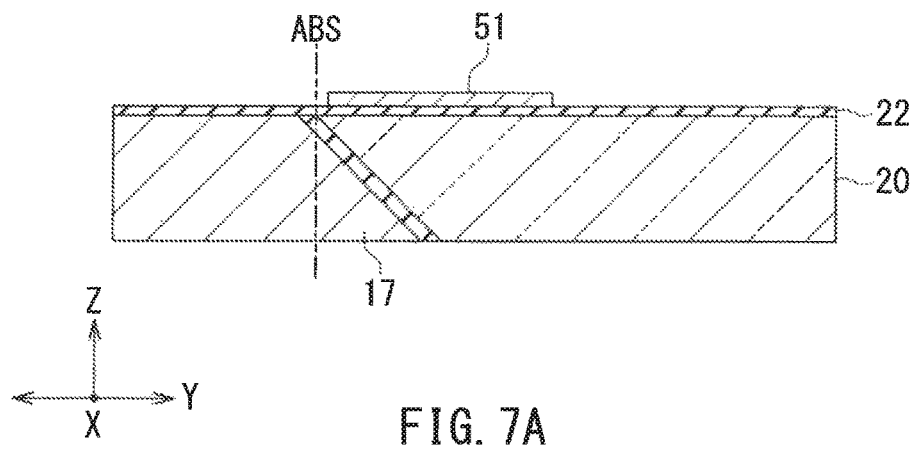
FIGS. 7A to 7C are explanatory diagrams showing a step of a manufacturing method for the thermally-assisted magnetic recording head according to the first embodiment of the invention.
Figure 7B:
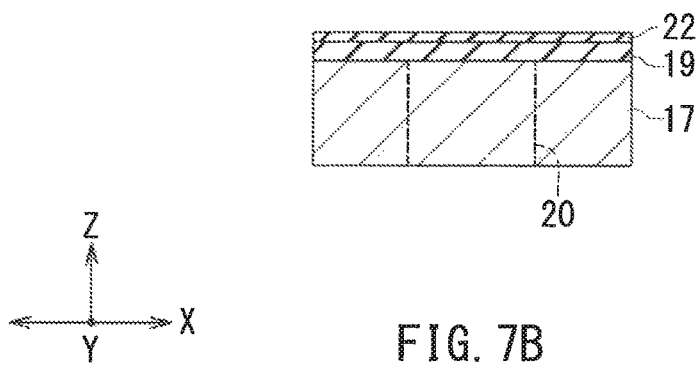
Figure 7C:
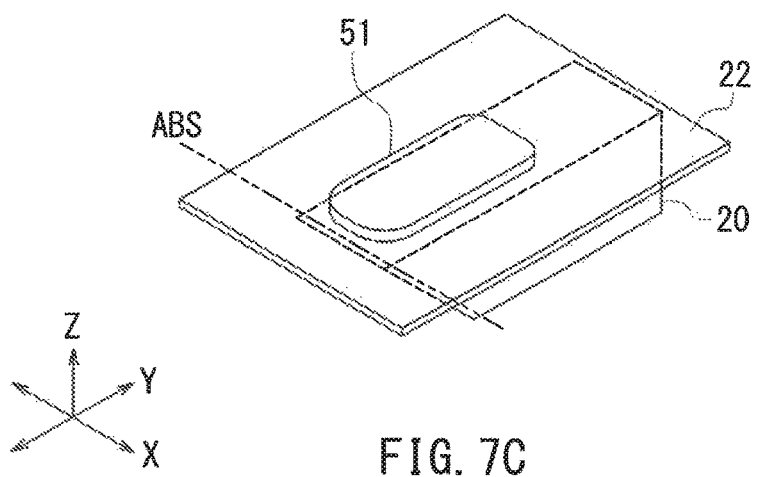

FIGS. 7A to 7C show a step that follows the formation of the top cladding layer 22. FIG. 7A is a cross-sectional view illustrating part of the stack. FIG. 7B shows a cross section of the stack taken at the location represented by ABS in FIG. 7A. FIG. 7C is a perspective view illustrating part of the stack. In this step, the excitation portion 51 is formed on the top cladding layer 22.

Figure 8A:
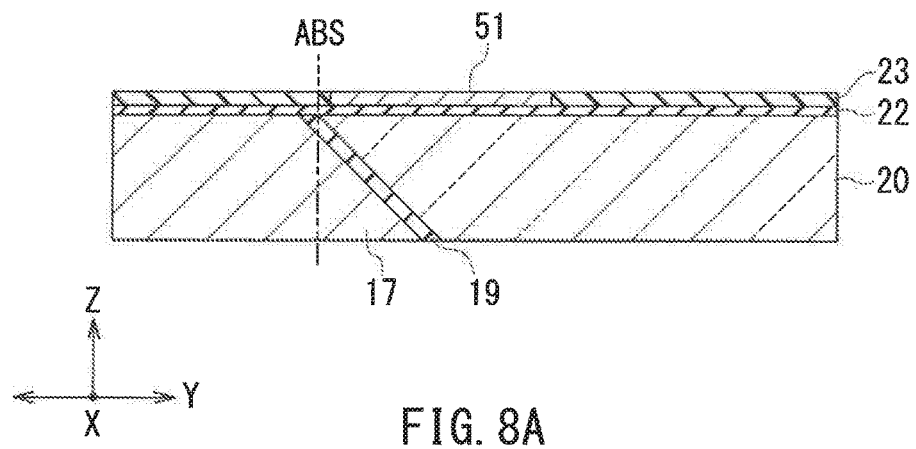
FIGS. 8A to 8C are explanatory diagrams showing a step that follows the step of FIGS. 7A to 7C.
Figure 8B:
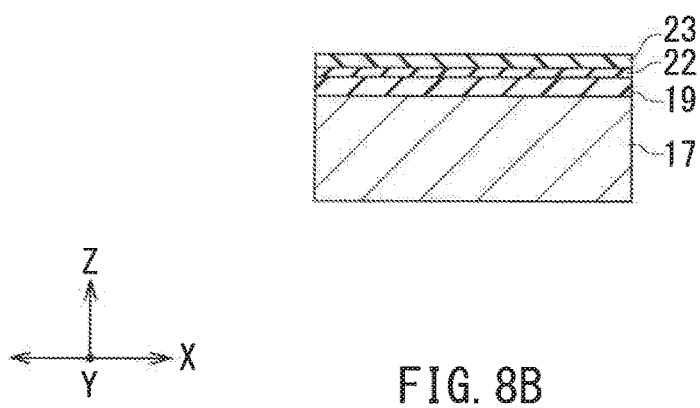
Figure 8C:
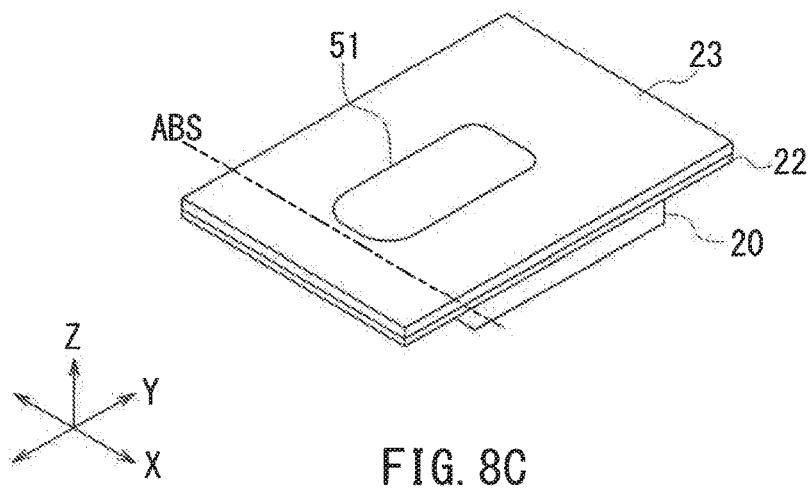

FIGS. 8A to 8C show a step that follows the step of FIGS. 7A to 7C. FIGS. 8A to 8C provide illustrations similar to those provided by FIGS. 7A to 7C, respectively. In this step, the dielectric layer 23 is formed over the entire top surface of the stack. The dielectric layer 23 is then polished by, for example, CMP, until the excitation portion 51 is exposed.

Figure 9A:
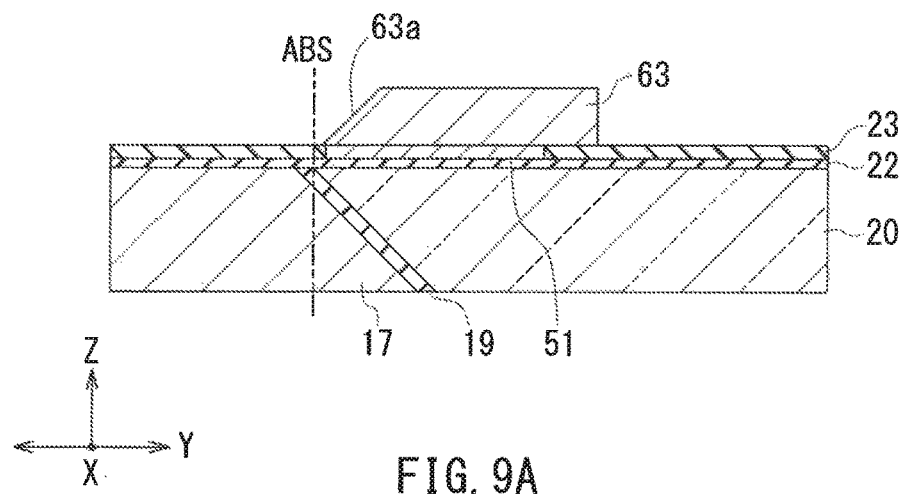
FIGS. 9A to 9C are explanatory diagrams showing a step that follows the step of FIGS. 8A to 8C.
Figure 9B:
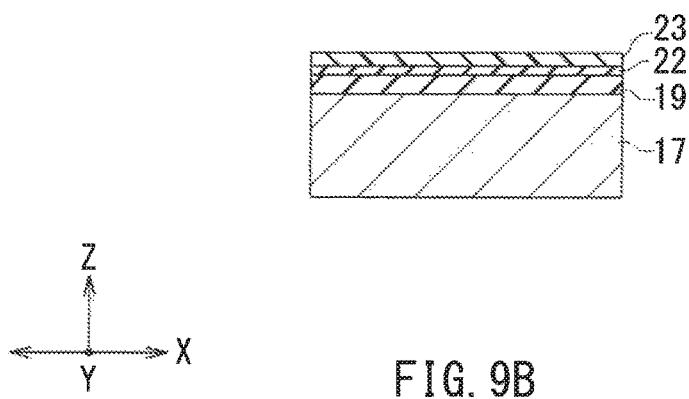
Figure 9C:
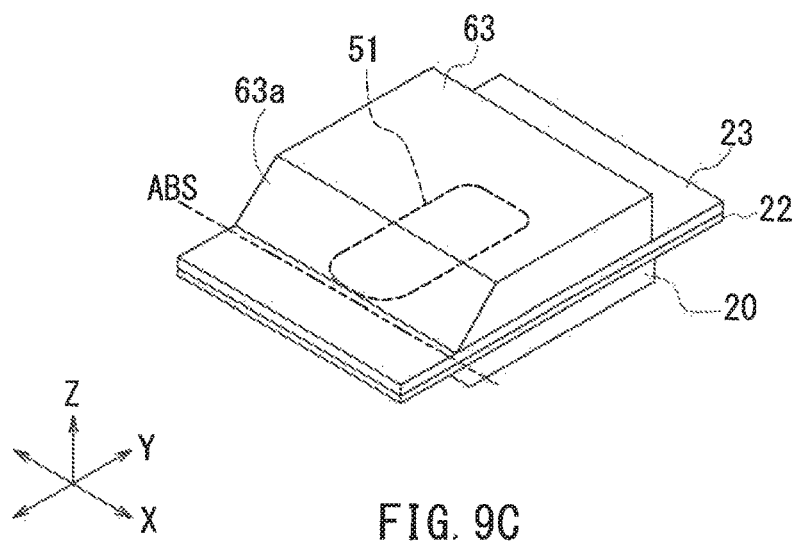

FIGS. 9A to 9C show a step that follows the step of FIGS. 8A to 8C. FIGS. 9A to 9C provide illustrations similar to those provided by FIGS. 8A to 8C, respectively. In this step, the third portion 63 of the heat sink 60 is formed on the excitation portion 51 and the dielectric layer 23 in the following manner. In this step, first, a metal layer is formed on the excitation portion 51 and the dielectric layer 23. The metal layer is then taper-etched by, for example, ion beam etching (hereinafter referred to as IBE), to provide the metal layer with the inclined surface 63a. In this etching, the ion beams are allowed to travel in a direction at an angle with respect to a direction perpendicular to the top surface of the metal layer. This etching makes the metal layer into the third portion 63.

Figure 10A:
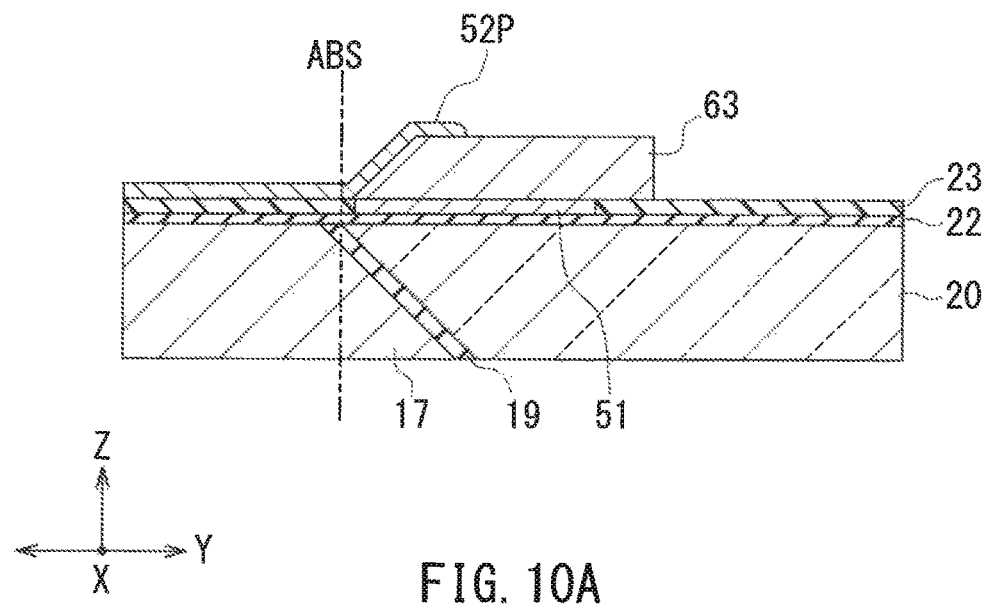
FIGS. 10A to 10D are explanatory diagrams showing a step that follows the step of FIGS. 9A to 9C.
Figure 10B:
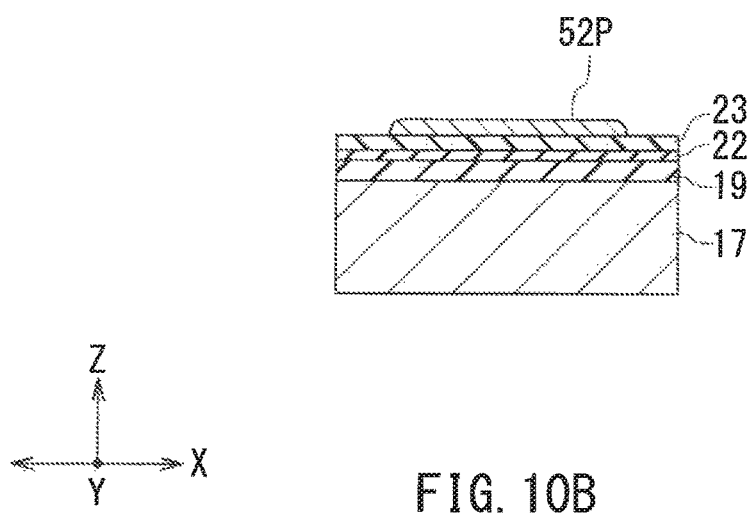
Figure 10C:
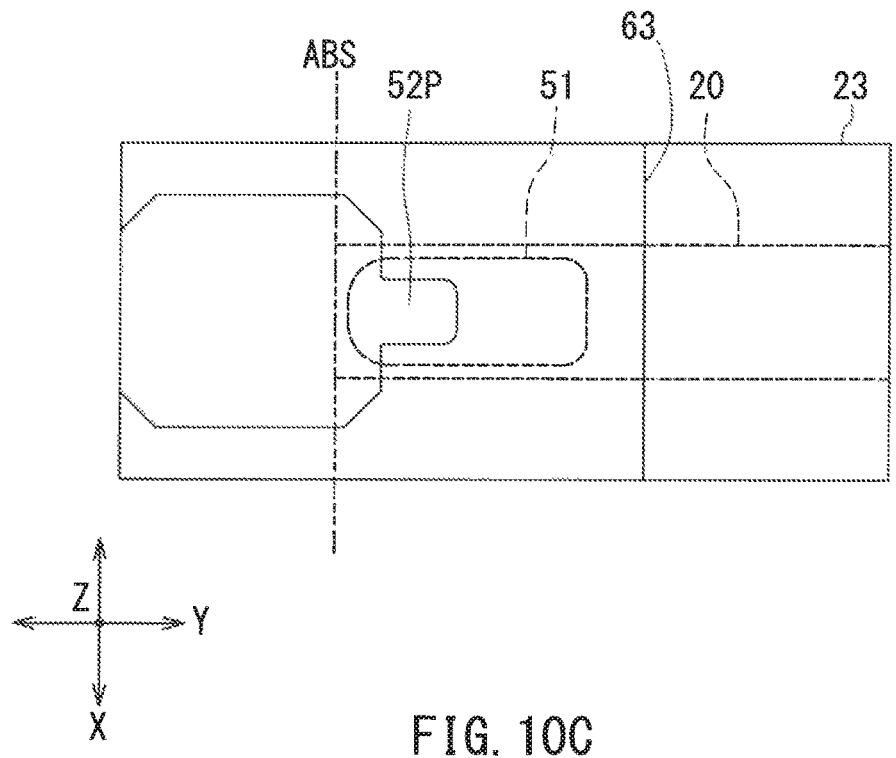
Figure 10D:
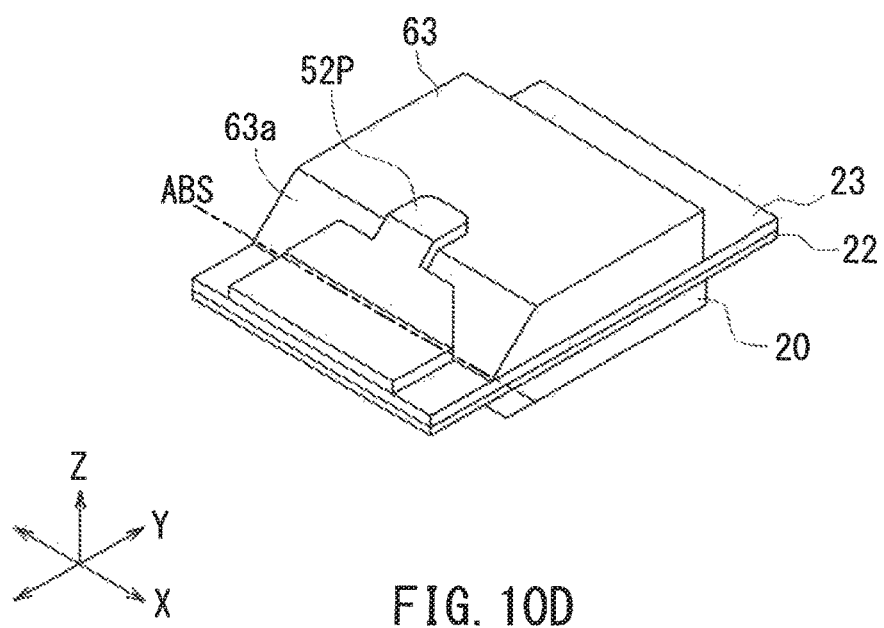

FIGS. 10A to 10D show a step that follows the step of FIGS. 9A to 9C. FIGS. 10A, 10B and 10D provide illustrations similar to those provided by FIGS. 9A, 9B and 9C, respectively. FIG. 10C is a plan view illustrating part of the stack. In this step, an initial plasmon generator layer 52P, which will become the emission portion 52 later, is formed on the third portion 63 and the dielectric layer 23 by a lift-off process, for example.

Figure 11A:
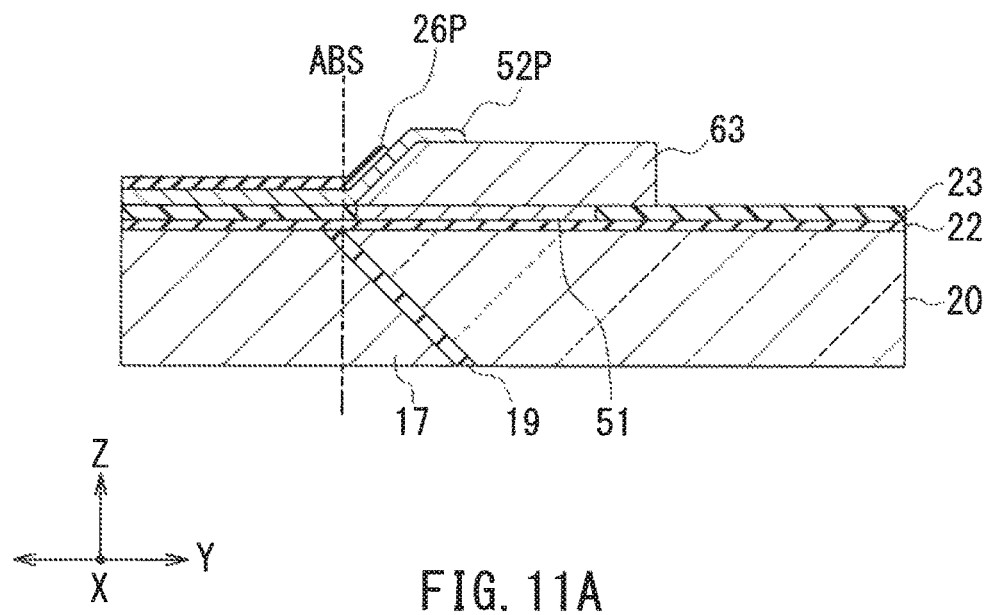
FIGS. 11A and 11B are explanatory diagrams showing a step that follows the step of FIGS. 10A to 10D.
Figure 11B:
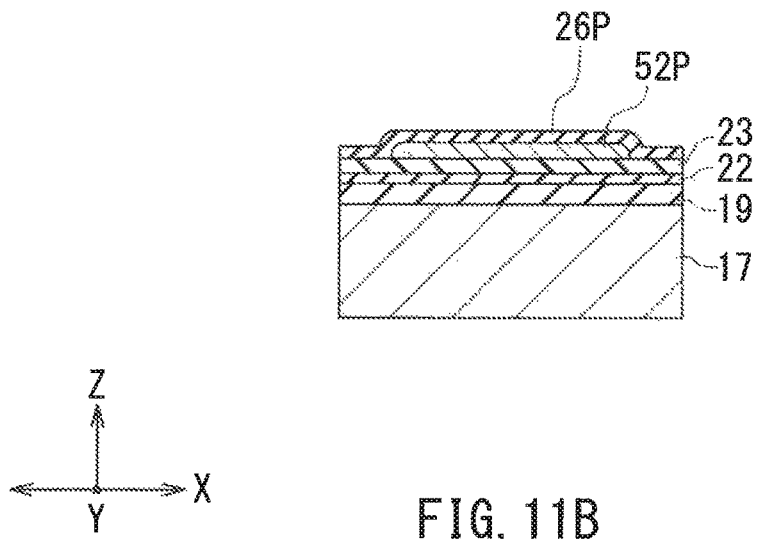

FIGS. 11A and 11B show a step that follows the step of FIGS. 10A to 10D. FIGS. 11A and 11B provide illustrations similar to those provided by FIGS. 10A and 10B, respectively. In this step, an initial dielectric layer 26P, which will become the dielectric layer 26 later, is formed on the initial plasmon generator layer 52P by a lift-off process, for example.

Figure 12A:
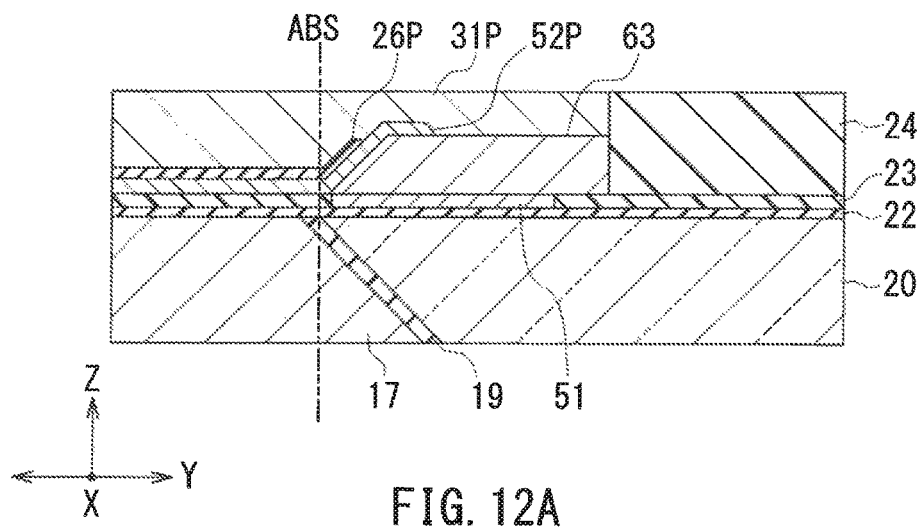
FIGS. 12A to 12C are explanatory diagrams showing a step that follows the step of FIGS. 11A and 11B.
Figure 12B:
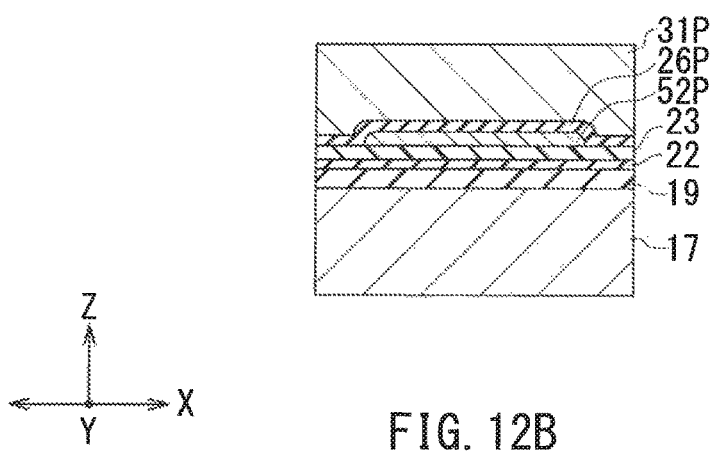
Figure 12C:
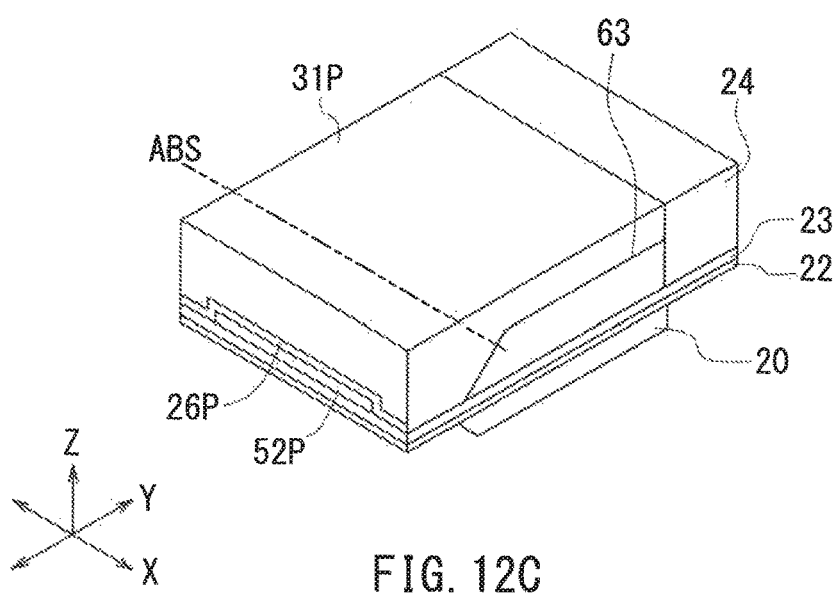

FIGS. 12A to 12C show a step that follows the step of FIGS. 11A and 11B. FIGS. 12A and 12B provide illustrations similar to those provided by FIGS. 11A and 11B, respectively. FIG. 12C is a perspective view illustrating part of the stack. In this step, first, a magnetic layer 31P, which will become the first layer 31 of the main pole 30 later, is formed on the third portion 63, the initial plasmon generator layer 52P and the initial dielectric layer 26P by a lift-off process, for example. Then, the dielectric layer 24 is formed over the entire top surface of the stack. The dielectric layer 24 is then polished by, for example, CMP, until the magnetic layer 31P is exposed.

Figure 13A:
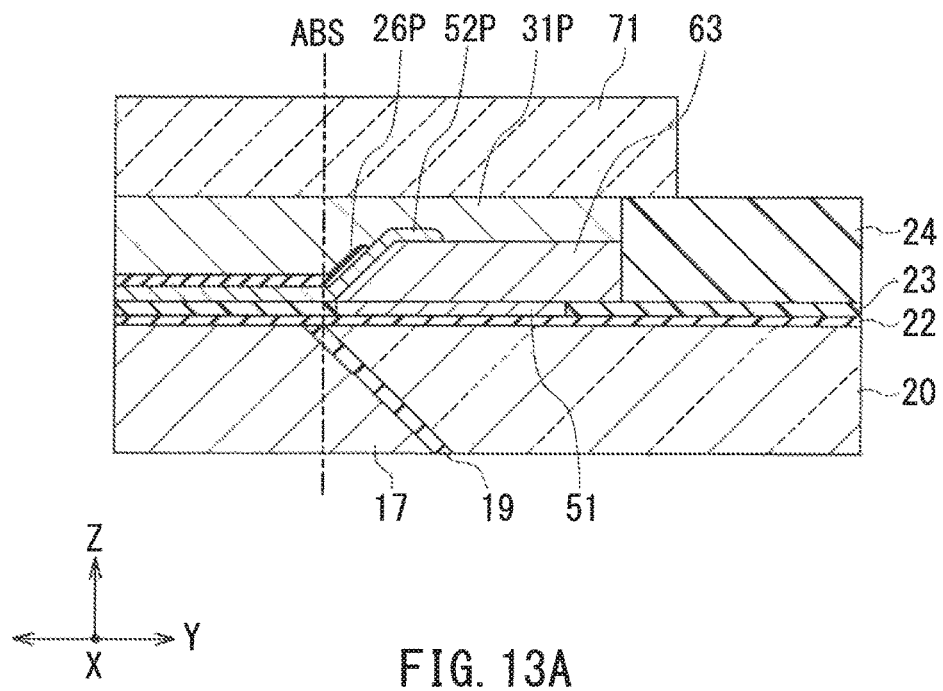
FIGS. 13A to 13D are explanatory diagrams showing a step that follows the step of FIGS. 12A to 12C.
Figure 13B:
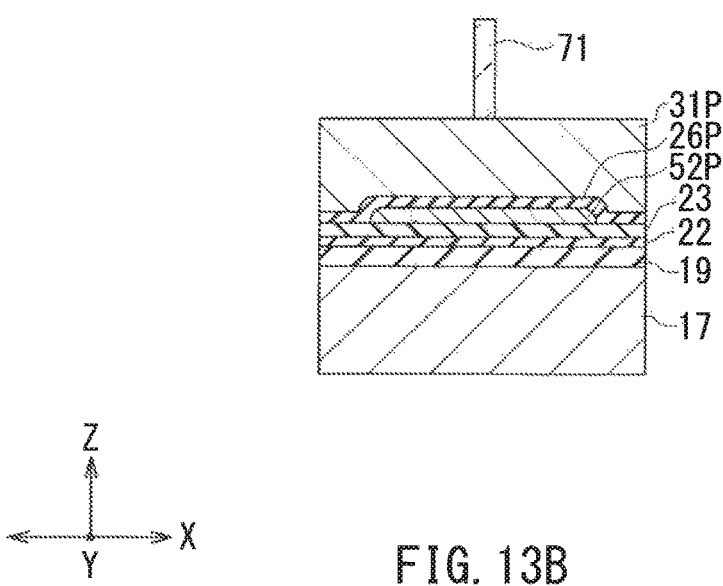
Figure 13C:
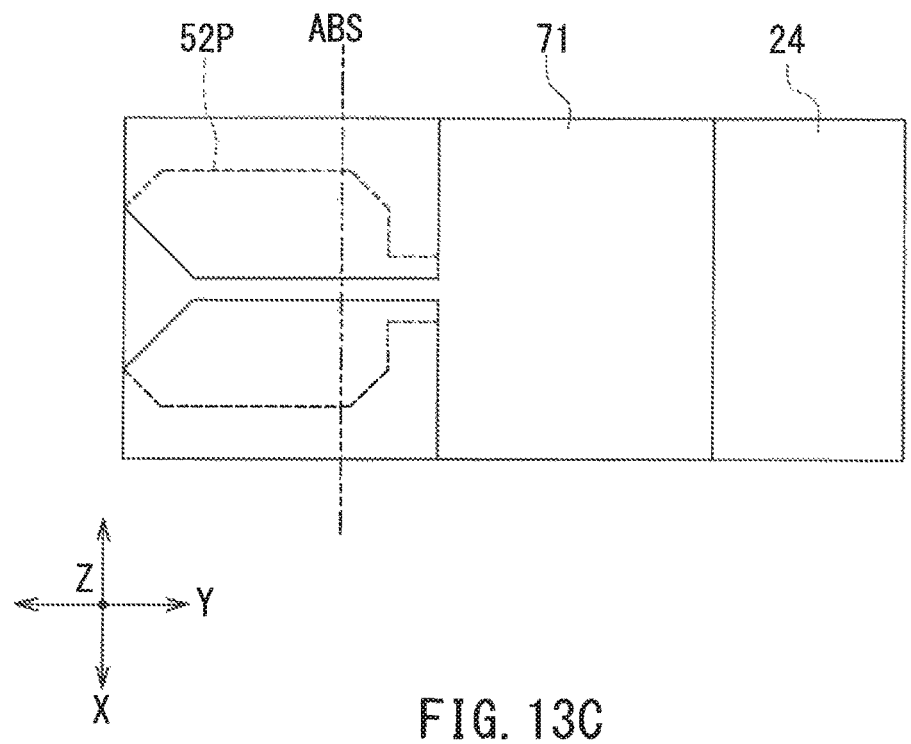
Figure 13D:
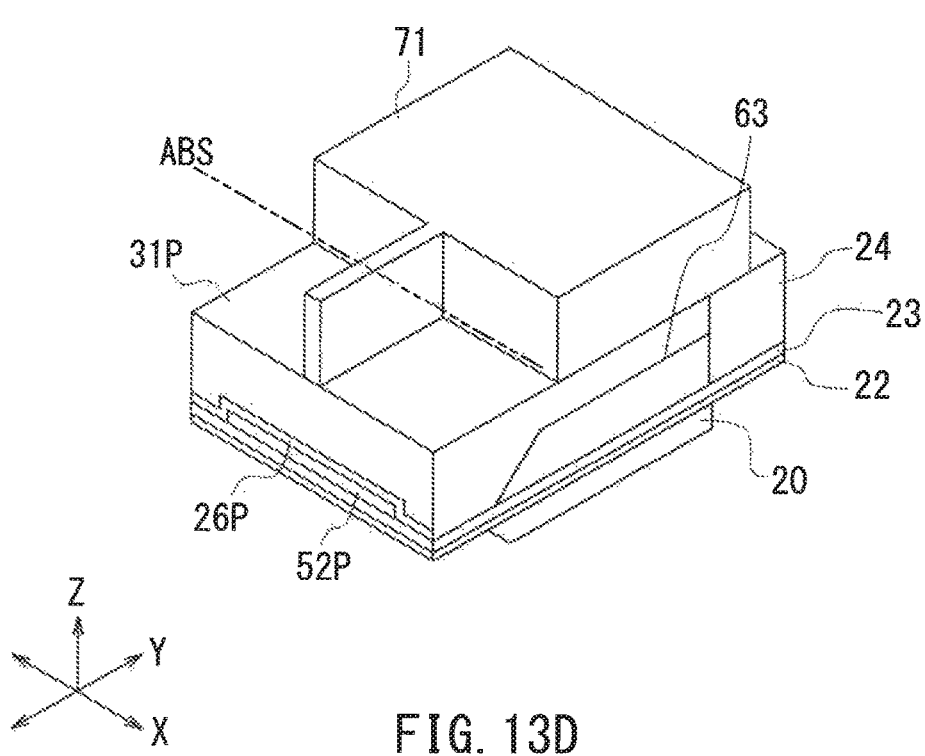

FIGS. 13A to 13D show a step that follows the step of FIGS. 12A to 12C. FIGS. 13A, 13B and 13D provide illustrations similar to those provided by FIGS. 12A, 12B and 12C, respectively. FIG. 13C is a plan view illustrating part of the stack. In this step, a mask 71 for patterning the magnetic layer 31P, the initial dielectric layer 26P and the initial plasmon generator layer 52P is formed on the magnetic layer 31P and the dielectric layer 24. The mask 71 is formed of carbon, for example.

Figure 14A:
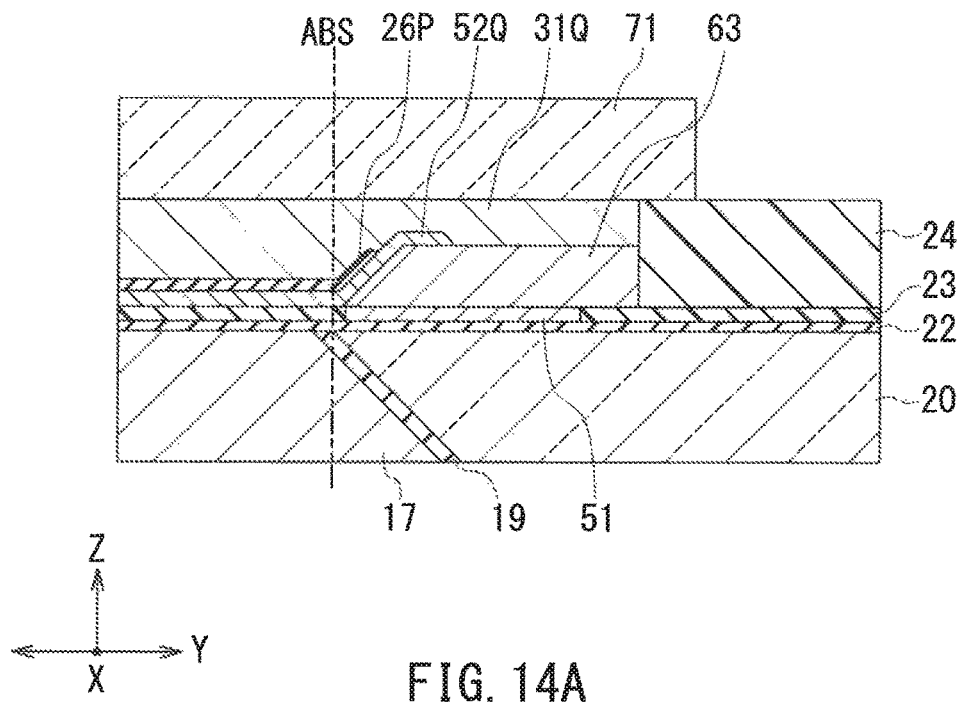
FIGS. 14A to 14C are explanatory diagrams showing a step that follows the step of FIGS. 13A to 13D.
Figure 14B:
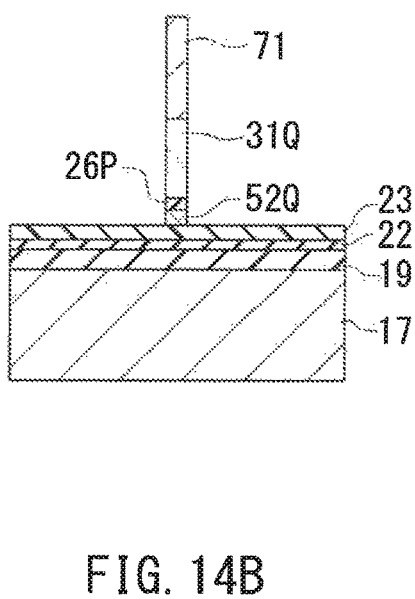
Figure 14C:
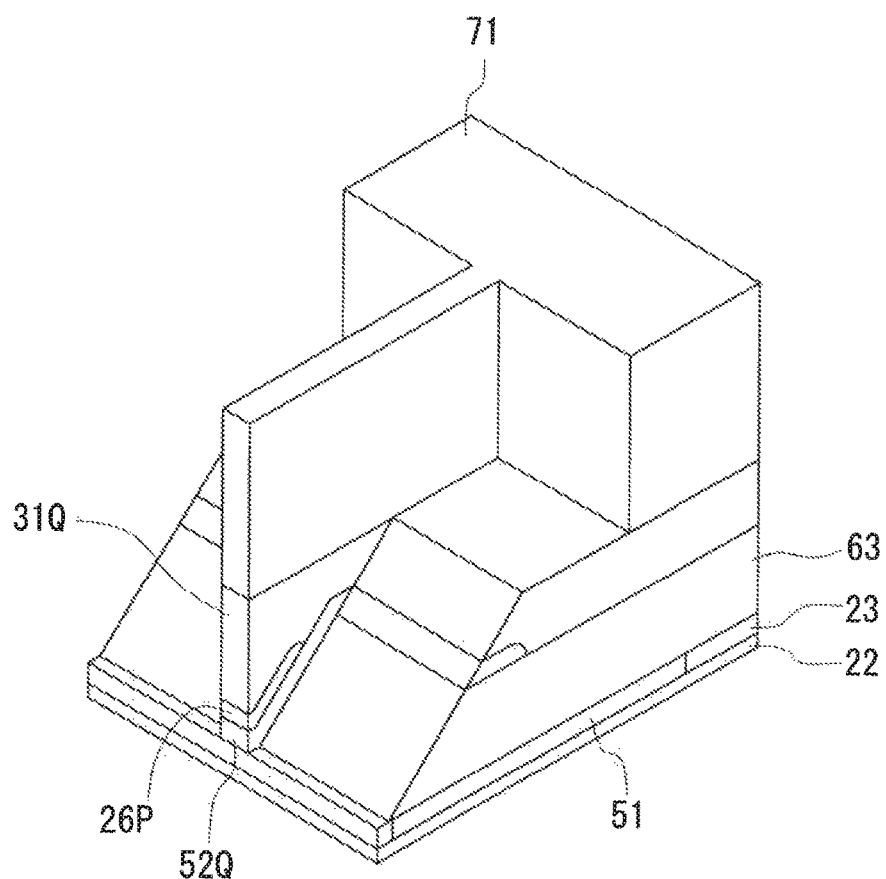
Figure 14C:
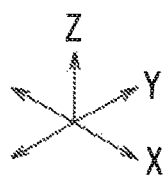

FIGS. 14A to 14C show a step that follows the step of FIGS. 13A to 13D. FIGS. 14A, 14B and 14C provide illustrations similar to those provided by FIGS. 13A, 13B and 13D, respectively. In this step, the magnetic layer 31P, the initial dielectric layer 26P and the initial plasmon generator layer 52P are taper-etched by, for example, IBE and thereby patterned, using the mask 71. In this etching, the ion beams are allowed to travel in a direction at an angle with respect to a direction perpendicular to the top surface of the mask 71. This etching provides the magnetic layer 31P with the first narrow portion 31A and the first wide portion 31B, and provides the initial plasmon generator layer 52P with the second narrow portion 52A and the second wide portion 52B. Further, as a result of this etching, the magnetic layer 31P becomes an initial first layer 31Q, and the initial plasmon generator layer 52P becomes an initial emission portion 52Q.

Figure 15A:
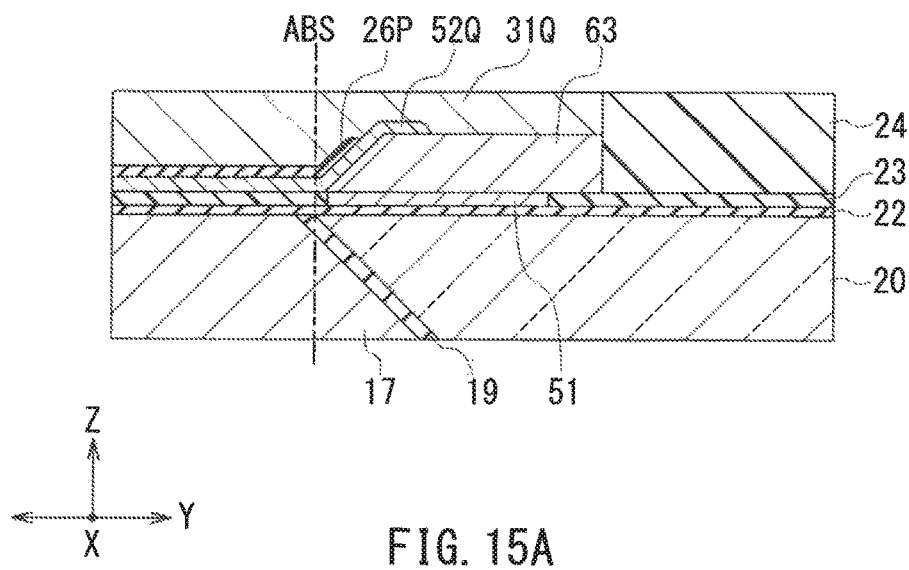
FIGS. 15A to 15C are explanatory diagrams showing a step that follows the step of FIGS. 14A to 14C.
Figure 15B:
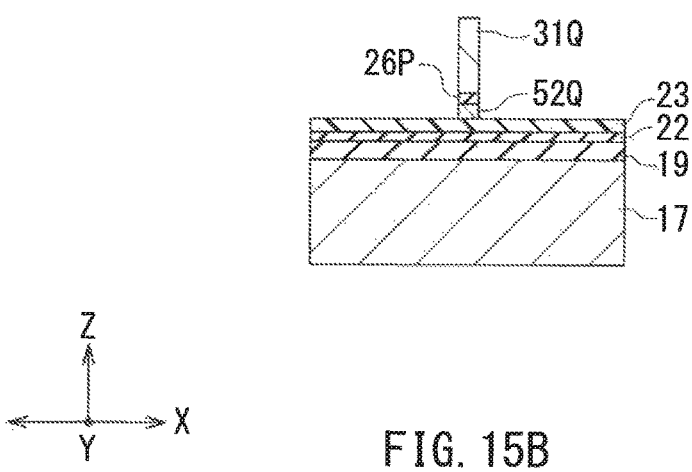
Figure 15C:
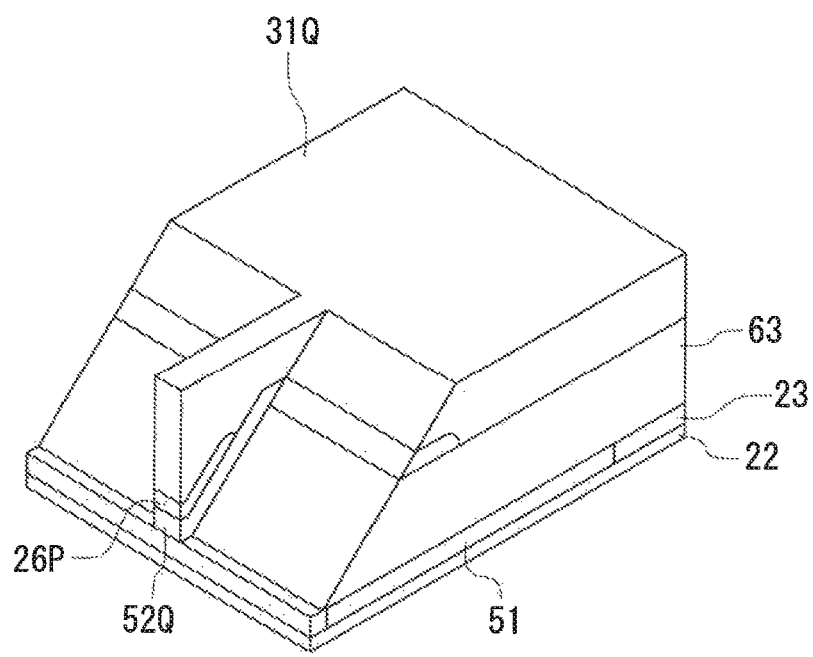

FIGS. 15A to 15C show a step that follows the step of FIGS. 14A to 14C. FIGS. 15A to 15C provide illustrations similar to those provided by FIGS. 14A to 14C, respectively. In this step, the mask 71 is removed.

Figure 16A:
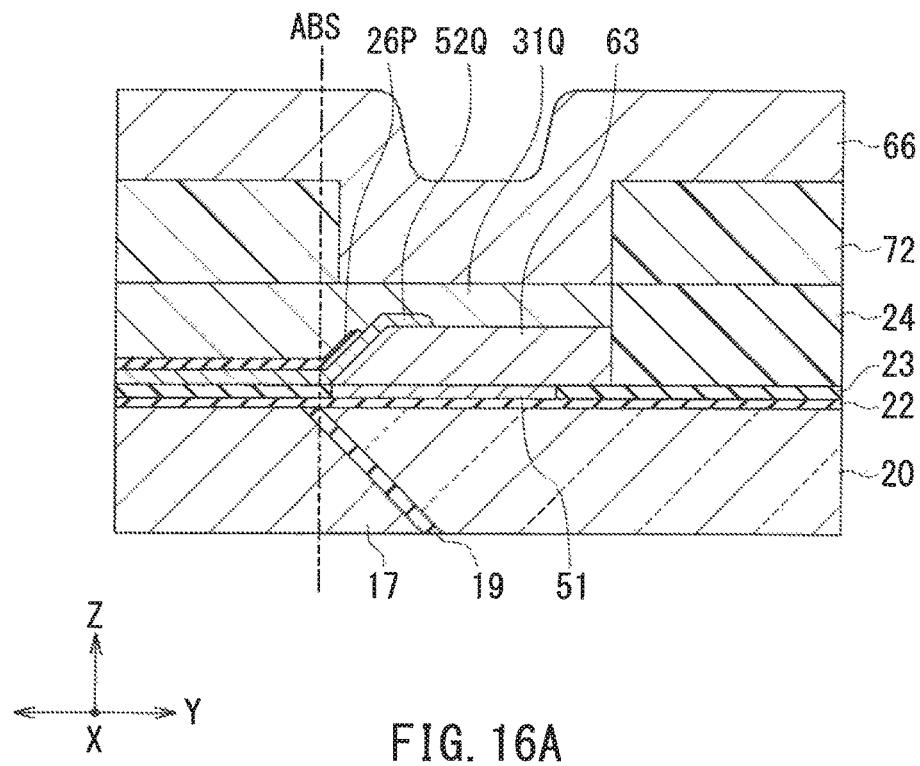
FIGS. 16A and 16B are explanatory diagrams showing a step that follows the step of FIGS. 15A to 15C.
Figure 16B:
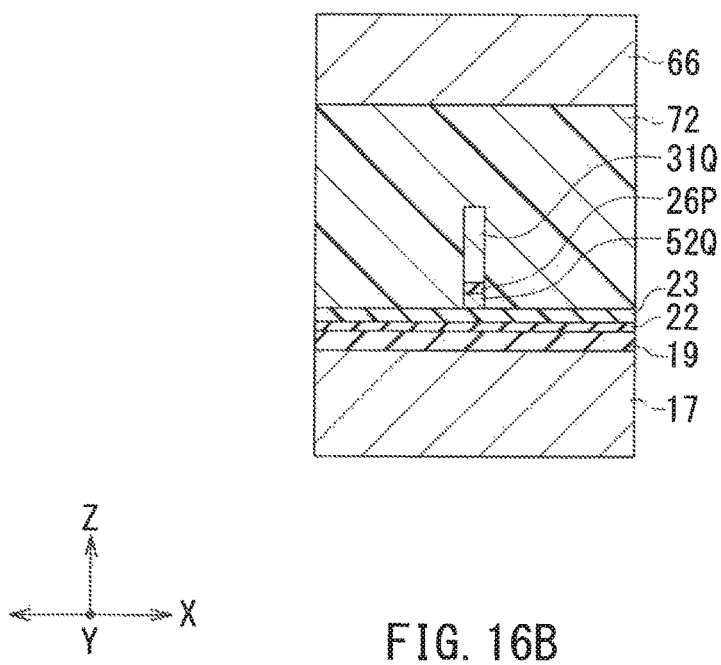

FIGS. 16A and 16B show a step that follows the step of FIGS. 15A to 15C. FIGS. 16A and 16B provide illustrations similar to those provided by FIGS. 15A and 15B, respectively. In this step, first, a mask 72 is formed to cover the stack. The mask 72 has an opening including an area where the first portion 61 and the second portion 62 of the heat sink 60 will be disposed later. The mask 72 is formed of a photoresist, for example. Next, a metal layer 66 is formed on the mask 72. The metal layer 66 is accommodated in part in the opening of the mask 72.

Figure 17A:
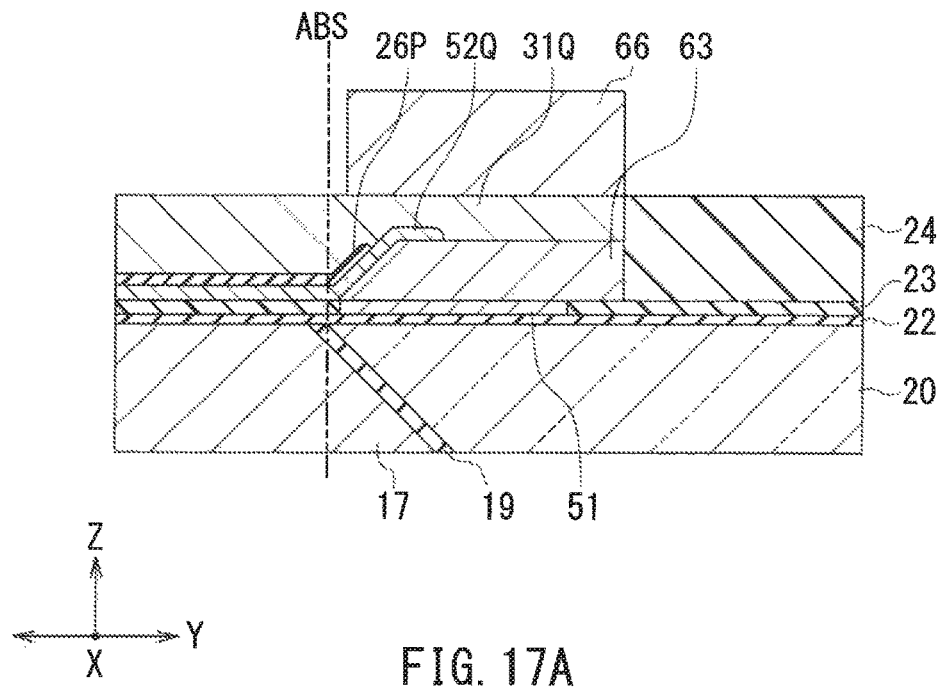
FIGS. 17A to 17C are explanatory diagrams showing a step that follows the step of FIGS. 16A and 16B.
Figure 17B:
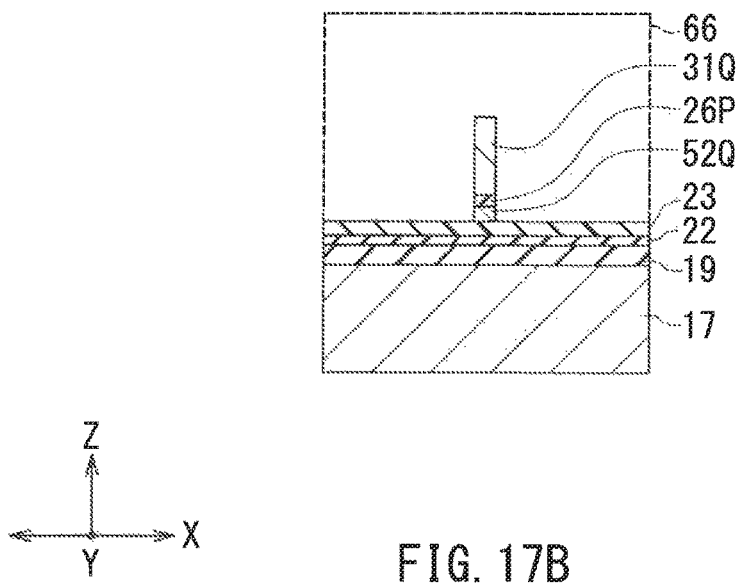
Figure 17C:
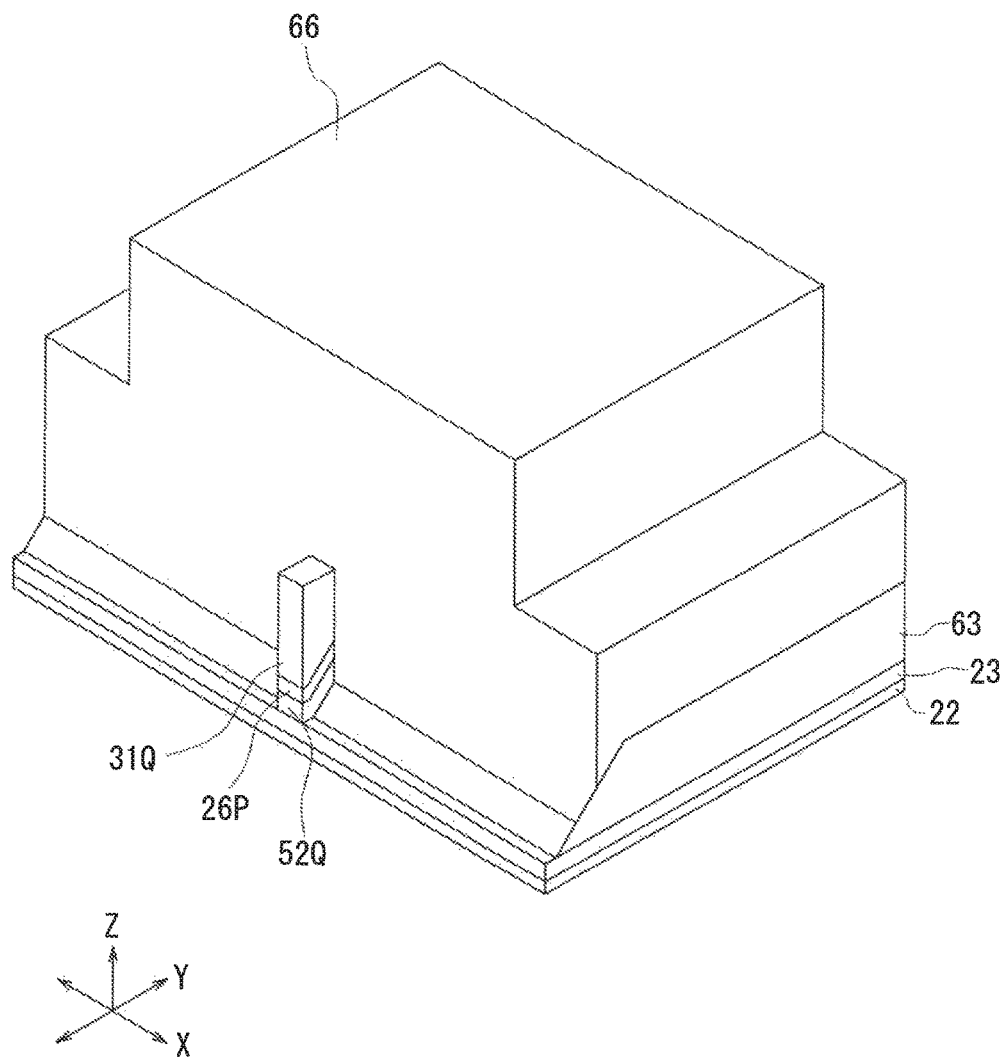

FIGS. 17A to 17C show a step that follows the step of FIGS. 16A and 16B. FIGS. 17A and 17B provide illustrations similar to those provided by FIGS. 16A and 16B, respectively. FIG. 17C is a perspective view illustrating part of the stack. In this step, first, the metal layer 66 is polished by, for example, CMP, until the mask 72 is exposed. The mask 72 is then removed.

Figure 18A:
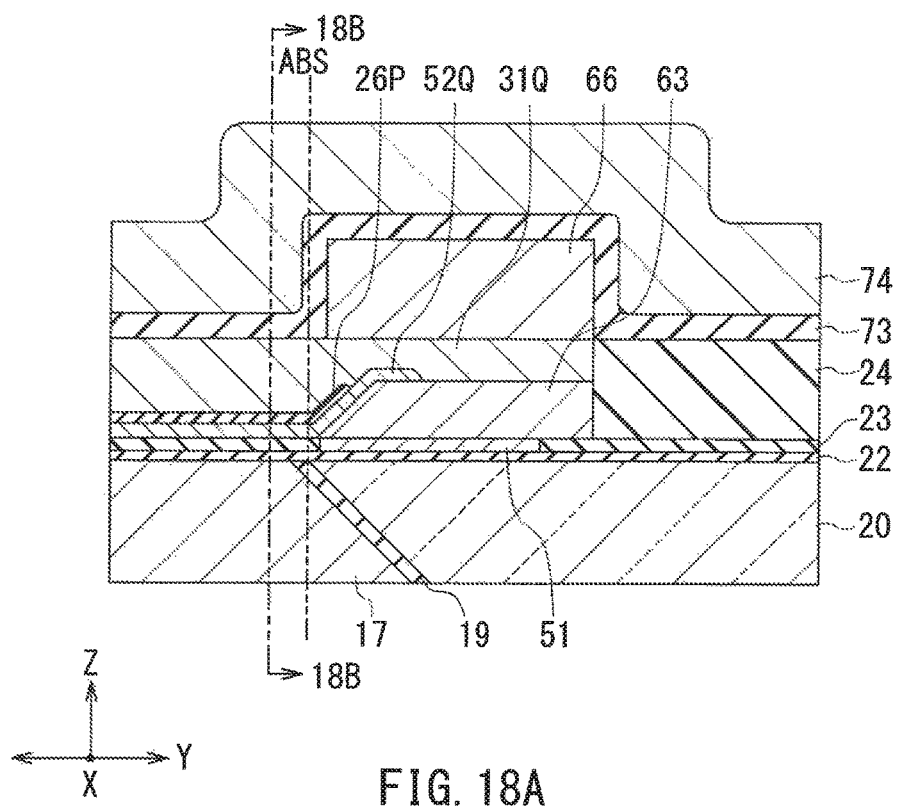
FIGS. 18A to 18C are explanatory diagrams showing a step that follows the step of FIGS. 17A to 17C.
Figure 18B:
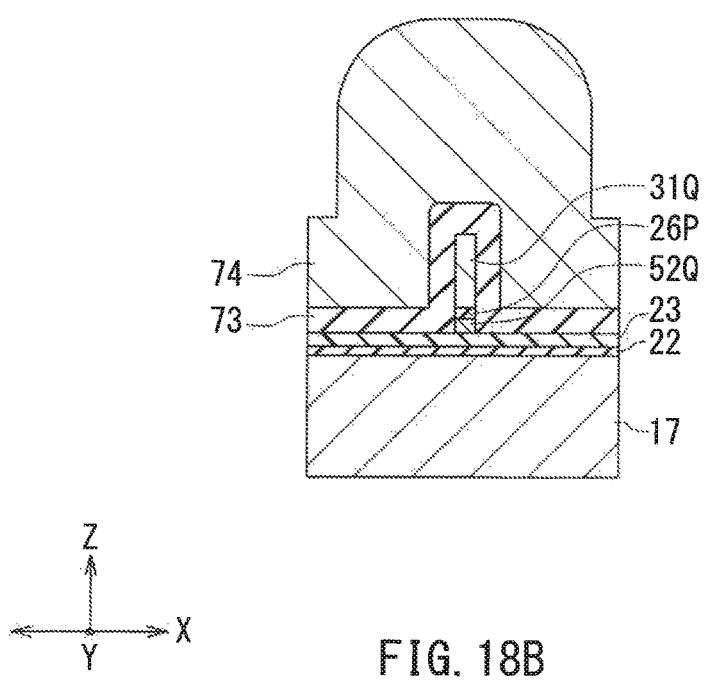
Figure 18C:
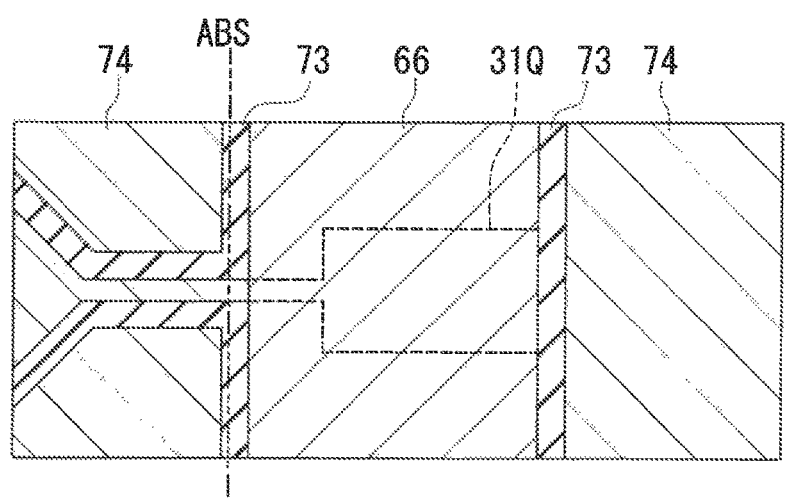

FIGS. 18A to 18C show a step that follows the step of FIGS. 17A to 17C. FIG. 18A provides an illustration similar to that provided by FIG. 17A. FIG. 18B shows a cross section taken along line 18B-18B in FIG. 18A. FIG. 18C is a cross-sectional view of part of the stack. FIG. 18C shows a cross section parallel to the top surface 1a of the substrate 1. In this step, first, a dielectric film 73 is formed over the entire top surface of the stack by, for example, atomic layer deposition. Then, a metal layer 74 is formed on the dielectric film 73.

Figure 19A:
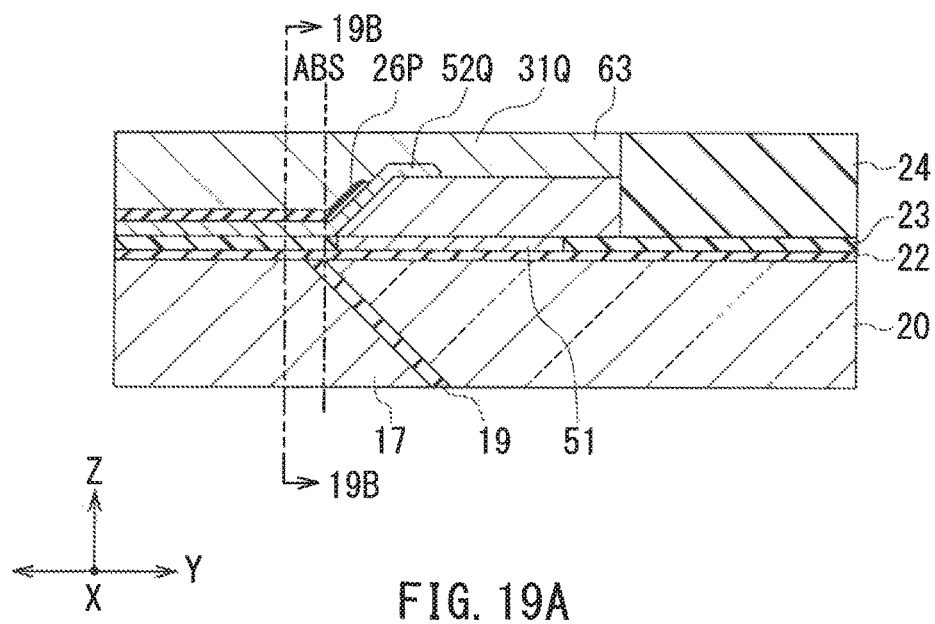
FIGS. 19A to 19C are explanatory diagrams showing a step that follows the step of FIGS. 18A to 18C.
Figure 19B:
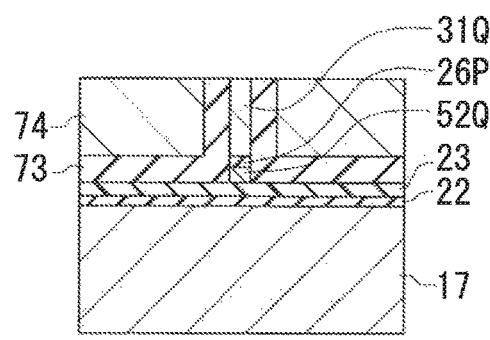
Figure 19C:
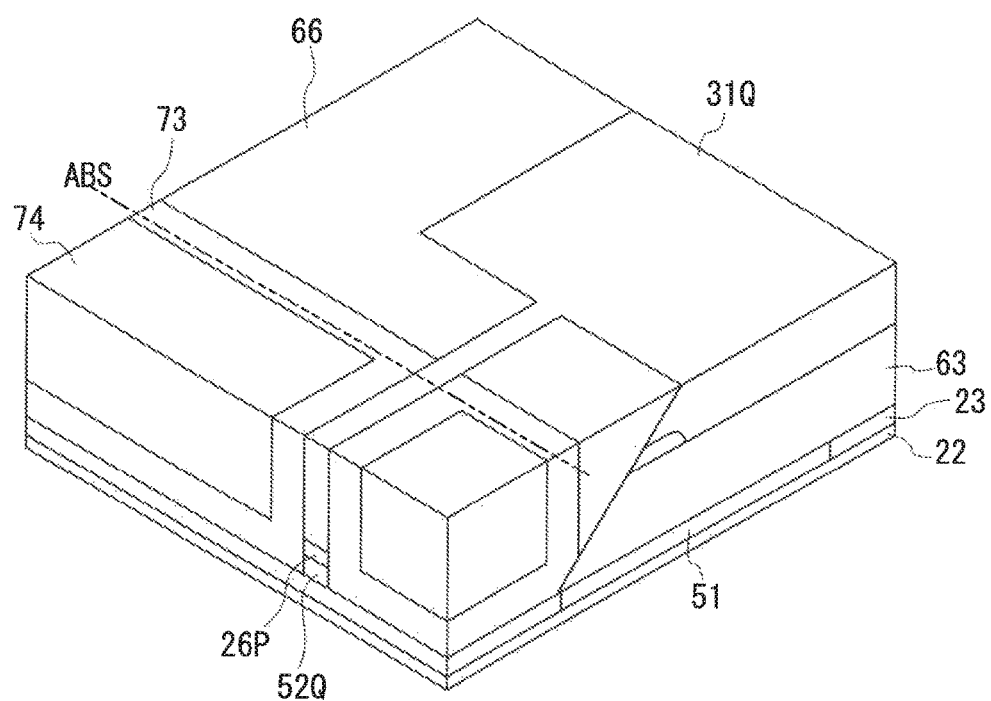

FIGS. 19A to 19C show a step that follows the step of FIGS. 18A to 18C. FIG. 19A provides an illustration similar to that provided by FIG. 18A. FIG. 19B shows a cross section taken along line 19B-19B in FIG. 19A. FIG. 19C is a perspective view of part of the stack. In this step, the metal layer 74 and the dielectric film 73 are polished by, for example, CMP, until the initial first layer 31Q is exposed.

Figure 20A:
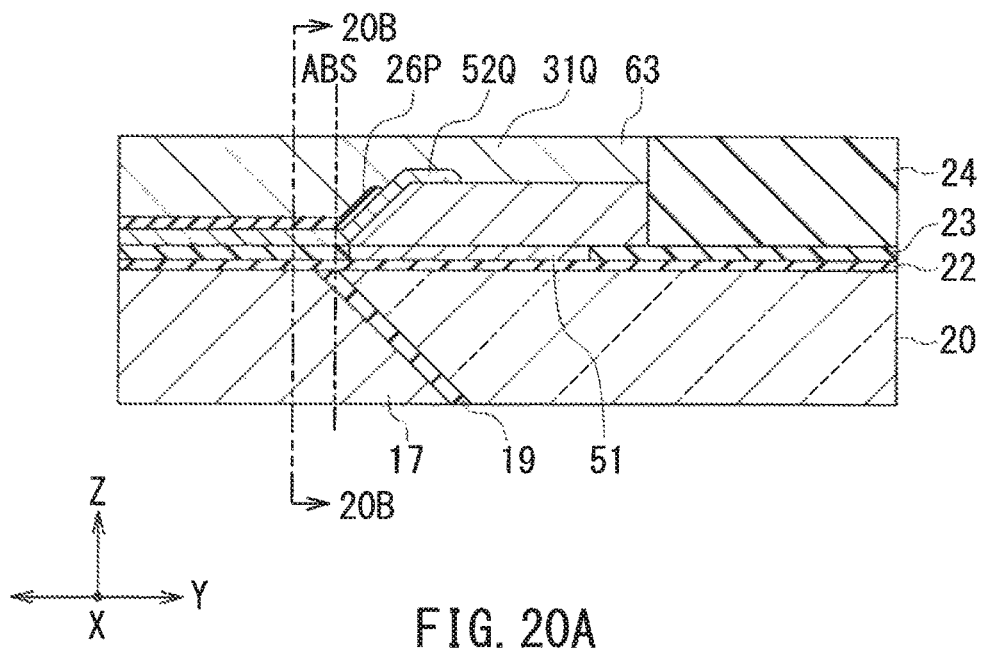
FIGS. 20A to 20C are explanatory diagrams showing a step that follows the step of FIGS. 19A to 19C.
Figure 20B:
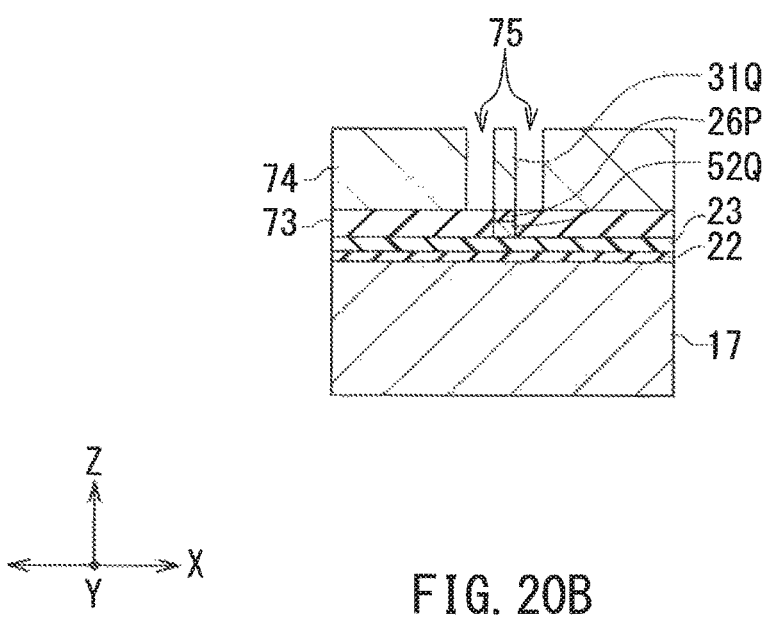
Figure 20C:
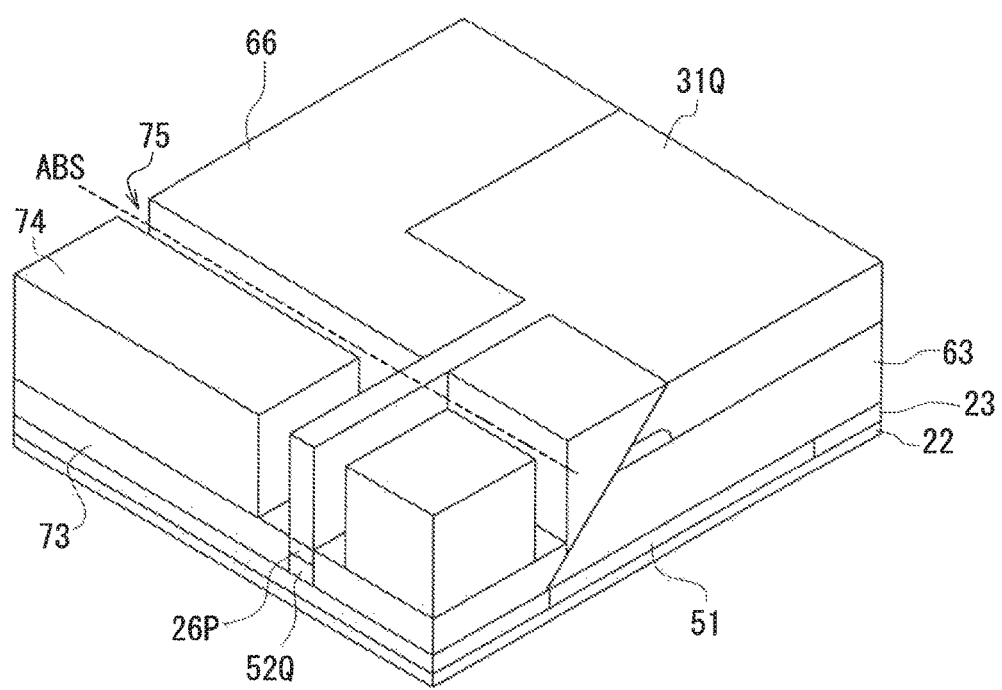

FIGS. 20A to 20C show a step that follows the step of FIGS. 19A to 19C. FIGS. 20A and 20C provide illustrations similar to those provided by FIGS. 19A and 19C, respectively. FIG. 20B shows a cross section taken along line 20B-20B in FIG. 20A. In this step, part of the dielectric film 73 is removed by, for example, wet etching. As a result, as shown in FIG. 20C, an accommodation portion 75 for accommodating the fourth portion 64 and the fifth portion 65 of the heat sink 60 is formed by the metal layer 66, the metal layer 74 and the initial first layer 31Q. The remainder of the dielectric film 73 after the etching will become the dielectric layer 25 later.

Figure 21A:
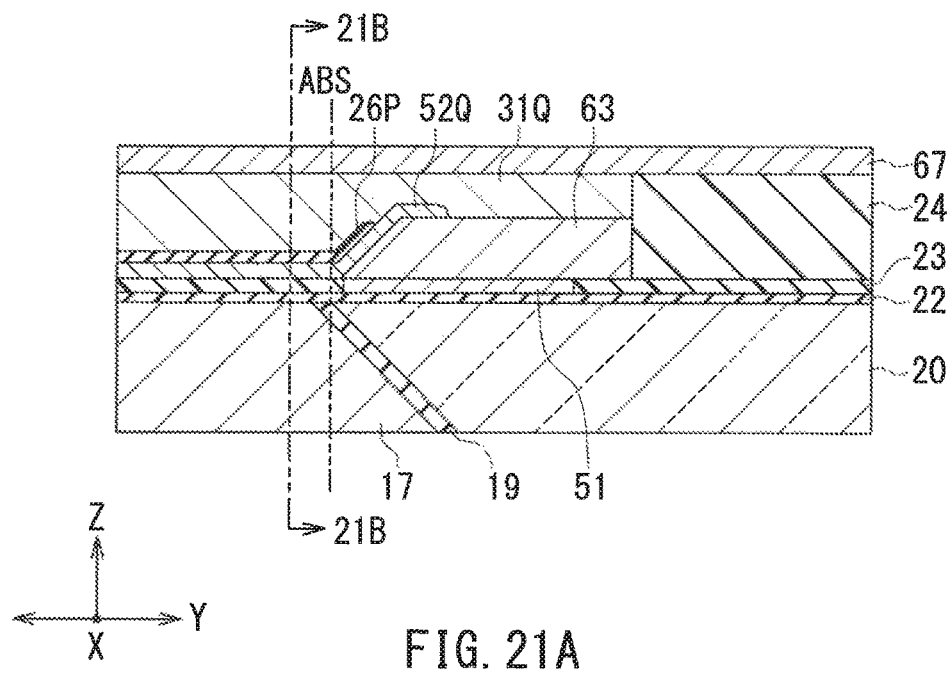
FIGS. 21A to 21C are explanatory diagrams showing a step that follows the step of FIGS. 20A to 20C.
Figure 21B:
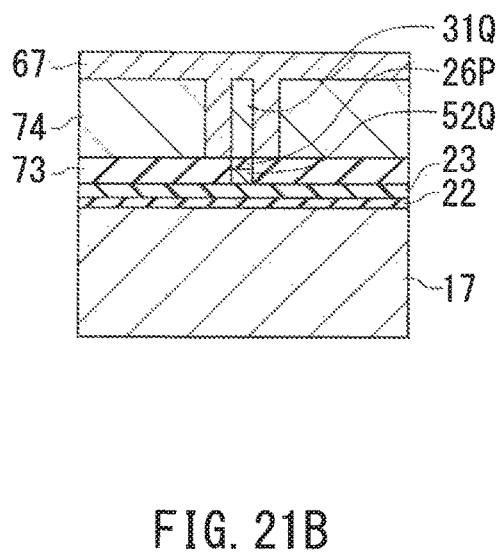
Figure 21C:
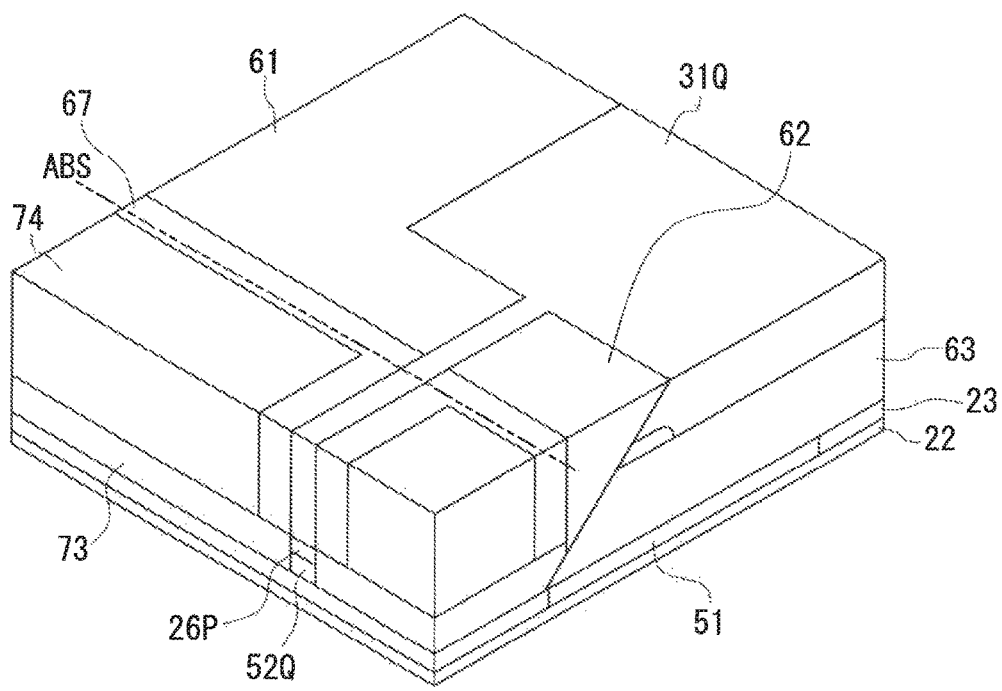

FIGS. 21A to 21C show a step that follows the step of FIGS. 20A to 20C. FIGS. 21A and 21C provide illustrations similar to those provided by FIGS. 20A and 20C, respectively. FIG. 21B shows a cross section taken along line 21B-21B in FIG. 21A. In this step, first, a metal layer 67 is formed over the entire top surface of the stack as shown in FIGS. 21A and 21B. Part of the metal layer 67 is accommodated in the accommodation portion 75. Next, as shown in FIG. 21C, the metal layers 66 and 67 are polished by, for example, CMP, until the top surface of the initial first layer 31Q is exposed. This makes the metal layer 66 into the first portion 61 and the second portion 62 of the heat sink 60.

Figure 22A:
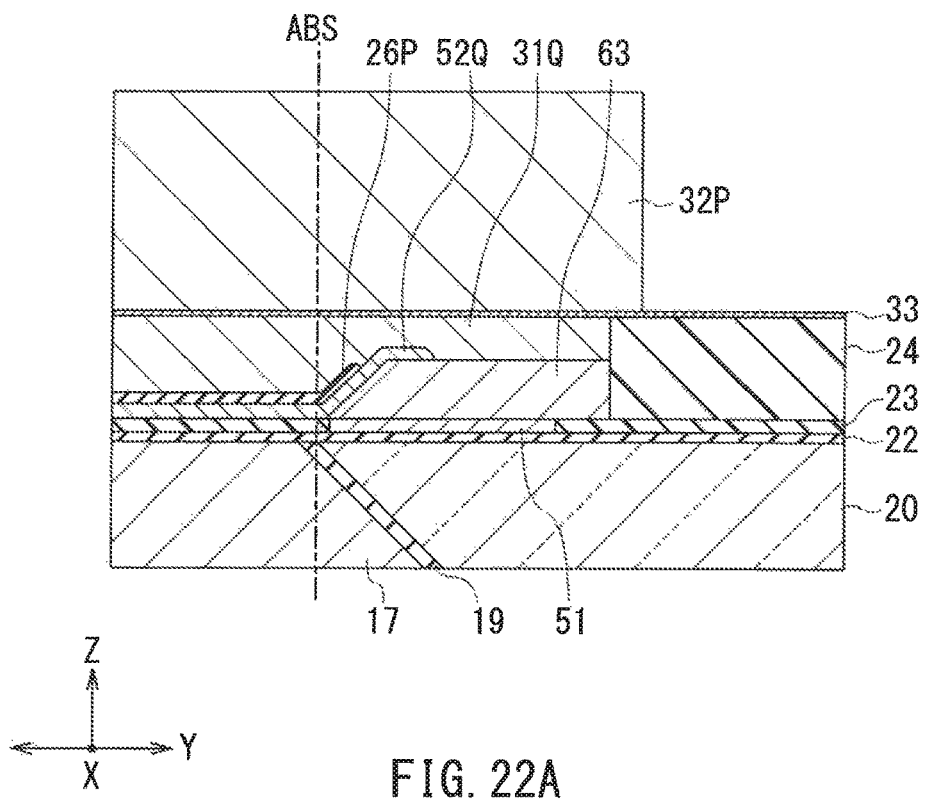
FIGS. 22A to 22C are explanatory diagrams showing a step that follows the step of FIGS. 21A to 21C.
Figure 22B:
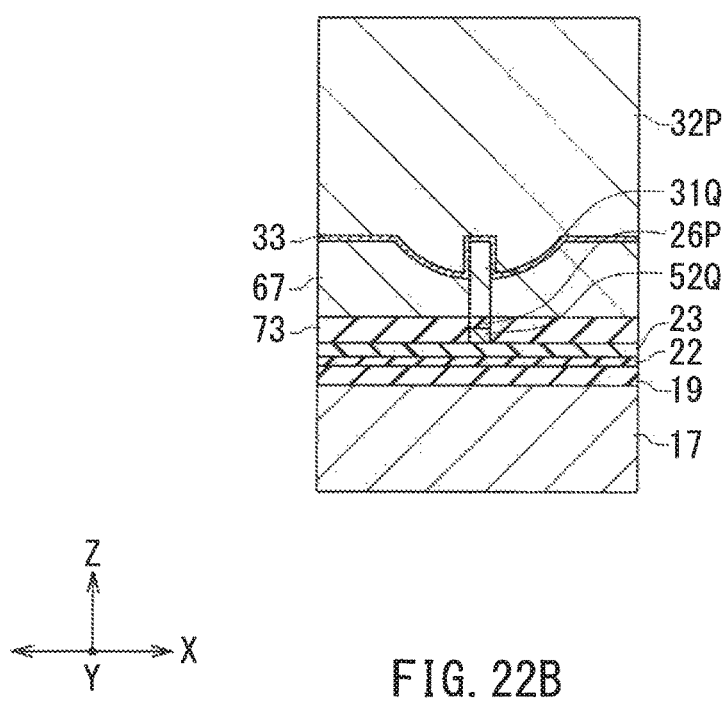
Figure 22C:
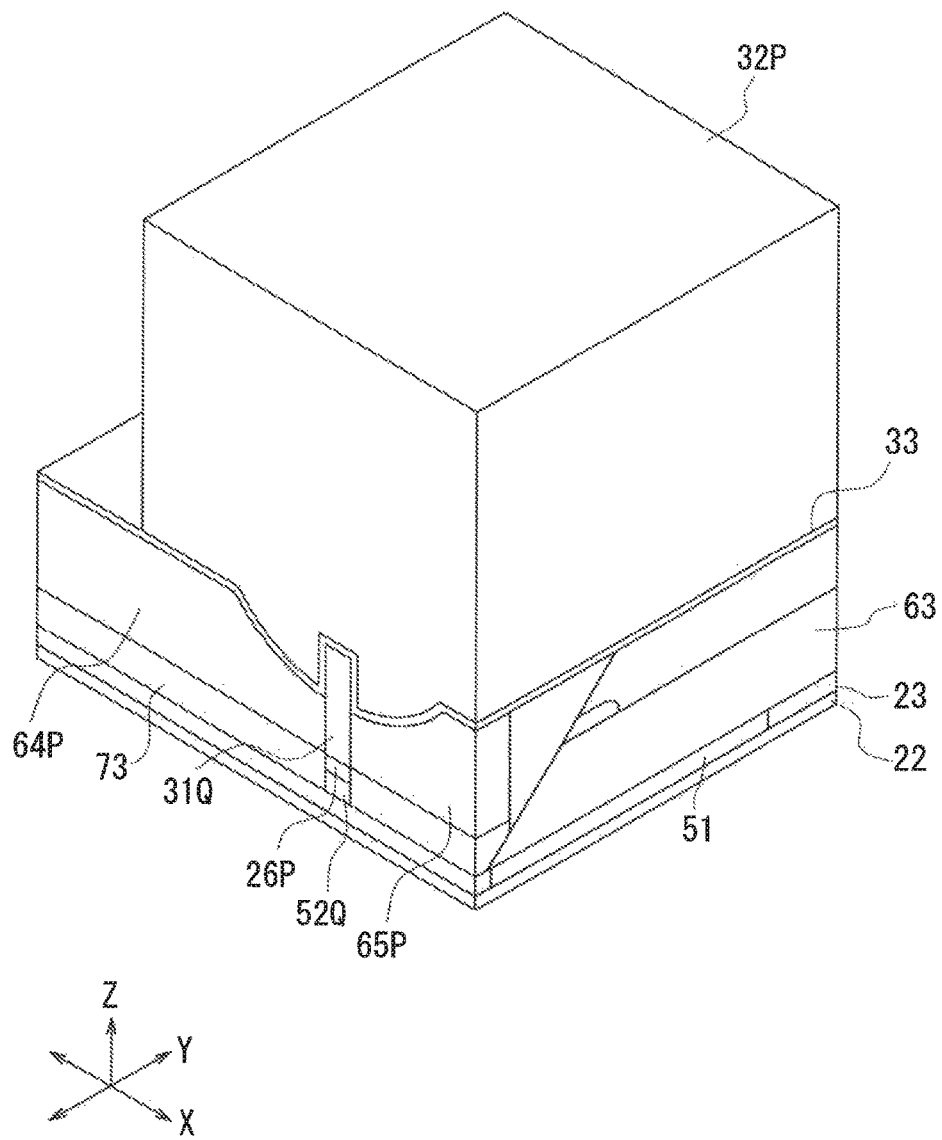

FIGS. 22A to 22C show a step that follows the step of FIGS. 21A to 21C. FIGS. 22A and 22C provide illustrations similar to those provided by FIGS. 21A and 21C, respectively. FIG. 22B shows a cross section taken at the location represented by ABS in FIG. 22A. In this step, first, the first and second portions 61 and 62 and the metal layers 67 and 74 are partially etched to form recesses for accommodating the protrusion of the second layer 32 of the main pole 30. Then, the diffusion-preventing film 33 is formed over the entire top surface of the stack. Next, an initial second layer 32P, which will become the second layer 32 later, is formed on the diffusion-preventing film 33 by plating, for example. The initial first layer 31Q and the initial second layer 32P constitute the initial main pole.

Steps to follow the step of FIGS. 22A to 22C will now be described with reference to FIG. 5. First, the coupling layer 33 shown in FIG. 5 is formed.

Next, the insulating film 35 is formed over the entire top surface of the stack. Then, the first layer 34A of the coil 34 is formed on the insulating film 35. The insulating layer 36 is then formed over the entire top surface of the stack. The insulating film 35 and the insulating layer 36 are then polished by, for example, CMP, until the initial second layer 32P, the coupling layer 33 and the first layer 34A are exposed. Next, the insulating layer 37 is formed over the entire top surface of the stack. The insulating layer 37 is then selectively etched to form therein an opening for exposing the top surface of the initial second layer 32P and an opening for exposing the top surface of the coupling layer 33.

Next, the first layer 38A of the yoke portion 38 is formed on the initial second layer 32P, and the coupling layer 39 is formed on the coupling layer 33. Then, the insulating film 40 is formed over the entire top surface of the stack. The insulating layer 37 and the insulating film 40 are then selectively etched to form therein an opening for connecting the second layer 34B of the coil 34 to the first layer 34A of the coil 34. Next, the second layer 34B of the coil 34 is formed on the insulating film 40. Next, the insulating layer 41 is formed over the entire top surface of the stack. The insulating film 40 and the insulating layer 41 are then polished by, for example, CMP, until the first layer 38A, the coupling layer 39 and the second layer 34B are exposed.

Next, the insulating layer 42 is formed on the second layer 34B of the coil 34 and the insulating layer 41. The second layer 38B of the yoke portion 38 is then formed on the first layer 38A of the yoke portion 38, the coupling layer 39 and the insulating layer 42. Next, the insulating layer 43 is formed over the entire top surface of the stack. The insulating layer 43 is then polished by, for example, CMP, until the second layer 38B is exposed. Then, the protective layer 44 is formed to cover the second layer 38B and the insulating layer 43. Wiring, terminals, and other components are then formed on the top surface of the protective layer 44. When the substructure is completed thus, the step of forming the medium facing surface 80 is performed. A protective film for covering the medium facing surface 80 may be formed thereafter. Being provided with the medium facing surface 80, each pre-head portion becomes a thermally-assisted magnetic recording head.

The step of forming the medium facing surface 80 includes the step of polishing the surface of each pre-head portion that has resulted from cutting the substructure, and the step of forming a rail on the polished surface for allowing the slider to fly.

As a result of the formation of the medium facing surface 80, the initial first layer 31Q becomes the first layer 31, the initial second layer 32P becomes the second layer 32, and the initial main pole becomes the main pole 30. Further, the initial emission portion 52Q becomes the emission portion 52, and the initial dielectric layer 26P becomes the dielectric layer 26. The metal layer 67 becomes the fourth portion 64 and the fifth portion 65 of the heat sink 60. The dielectric film 73 becomes the dielectric layer 25.

As described above, the manufacturing method for the thermally-assisted magnetic recording head according to the present embodiment includes the steps of forming the waveguide, forming the plasmon generator 50 and the main pole 30, and forming the heat sink 60.

The step of forming the plasmon generator 50 and the main pole 30 includes the steps of: forming the initial plasmon generator layer 52P; patterning the initial plasmon generator layer 52P to provide the initial plasmon generator layer 52P with the second narrow portion 52A and the second wide portion 52B; forming the magnetic layer 31P; and patterning the magnetic layer 31P to provide the magnetic layer 31P with the first narrow portion 31A and the first wide portion 31B.

In the present embodiment, in particular, the magnetic layer 31P is formed after the formation of the initial plasmon generator layer 52P. As shown in FIGS. 14A to 14C, the step of patterning the initial plasmon generator layer 52P and the step of patterning the magnetic layer 31P are performed at the same time.

The step of forming the heat sink 60 includes the step of forming the first portion 61 and the second portion 62 after the magnetic layer 31P and the initial plasmon generator layer 52P have been patterned.

The specific functions and effects of the thermally-assisted magnetic recording head according to the present embodiment will now be described.

The main pole 30 includes the first narrow portion 31A and the first wide portion 31B, and the plasmon generator 50 includes the second narrow portion 52A and the second wide portion 52B. The front end face 31a of the main pole 30 has the first and second edges E1 and E2, and the near-field light generating surface 52a has the third and fourth edges E3 and E4. The first edge E1 and the third edge E3 are located on the first imaginary straight line L1, and the second edge E2 and the fourth edge E4 are located on the second imaginary straight line L2. By virtue of the these features, the present embodiment enables reduction of the widths of the front end face 31a and the near-field light generating surface 52a to achieve a small track width, and also enables precise alignment between the front end face 31a and the near-field light generating surface 52a.

The first narrow portion 31A has the first side surface S1 and the second side surface S2, and the second narrow portion 52A has the third side surface S3 and the fourth side surface S4. The heat sink 60 includes the first portion 61 adjacent to the first side surface S1 and the third side surface S3, and the second portion 62 adjacent to the second side surface S2 and the fourth side surface S4. The distance from the medium facing surface 80 to each of the first and second portions 61 and 62 falls within the range of 10 to 50 nm. By virtue of these features, the present embodiment enables sufficient dissipation of heat from the second narrow portion 52A, thereby enabling prevention of the problem resulting from the heat generated by the plasmon generator 50.

In the present embodiment, since the distance from the medium facing surface 80 to each of the first and second portions 61 and 62 is 50 nm or less, it is possible to sufficiently dissipate heat from a part of the second narrow portion 52A near the near-field light generating surface 52a.

Further, the manufacturing method according to the present embodiment allows the first narrow portion 31A, the second narrow portion 52A and the first and second portions 61 and 62 of the heat sink 60 to be formed in a self-aligned manner to have the positional relationship described previously.

The first and second portions 61 and 62 are each formed of a material having a higher thermal conductivity than that of the second narrow portion 52A. In many cases, such a material is also high in electrical conductivity. Thus, if the first and second portions 61 and 62 are exposed in the medium facing surface 80, the efficiency of generation of near-field light at the near-field light generating surface 52a may be reduced. According to the present embodiment, since the first and second portions 61 and 62 are each located at a distance of 10 nm from the medium facing surface 80, it is possible to prevent the efficiency of generation of near-field light at the near-field light generating surface 52a from being reduced by the first and second portions 61 and 62.

The heat sink 60 further includes the third portion 63. This enables more effective heat dissipation from the second narrow portion 52A.

The third portion 63 has the inclined surface 63a. This reduces the distance from the medium facing surface 80 to the third portion 63.

The first to fourth end faces 31Ba, 31Bb, 52Ba and 52Bb are located in one imaginary plane P. In the present embodiment, the imaginary plane P is inclined with respect to the medium facing surface 80. These features result from the step of patterning the magnetic layer 31P and the initial plasmon generator layer 52P. By virtue of these features, the present embodiment allows the widths of the front end face 31a and the near-field light generating surface 52a to be accurately controlled.

The imaginary plane P may or may not include the inclined surface 63a of the third portion 63 of the heat sink 60. FIG. 1 shows an example in which the imaginary plane P includes the inclined surface 63a. An example in which the imaginary plane P does not include the inclined surface 63a will be described later.

The plasmon generator 50 includes the excitation portion 51. The excitation portion 51 can be formed of a metal material suitable for excitation and propagation of surface plasmons. The present embodiment thus enables increasing the efficiency of excitation and propagation of surface plasmons.

The heat sink 60 includes the fourth portion 64 and the fifth portion 65. This enables more effective heat dissipation from the second narrow portion 52A. The fourth portion 64 is not adjacent to the third side surface S3, and the fifth portion 65 is not adjacent to the fourth side surface S4. This makes it possible to prevent the efficiency of generation of near-field light at the near-field light generating surface 52a from being reduced by the fourth and fifth portions 64 and 65.

The fourth portion 64 is preferably higher in Vickers hardness than the first portion 61, and the fifth portion 65 is preferably higher in Vickers hardness than the second portion 62. This prevents the fourth and fifth portions 64 and 65 from being deformed by the heat generated by the second narrow portion 52A.

The main pole 30 includes the second layer 32, i.e., the third wide portion. This enables a large amount of magnetic flux to be supplied to the first narrow portion 31A, thus enabling generation of a write magnetic field of sufficient magnitude from the front end face 31a.

Modification Example

Figure 23:
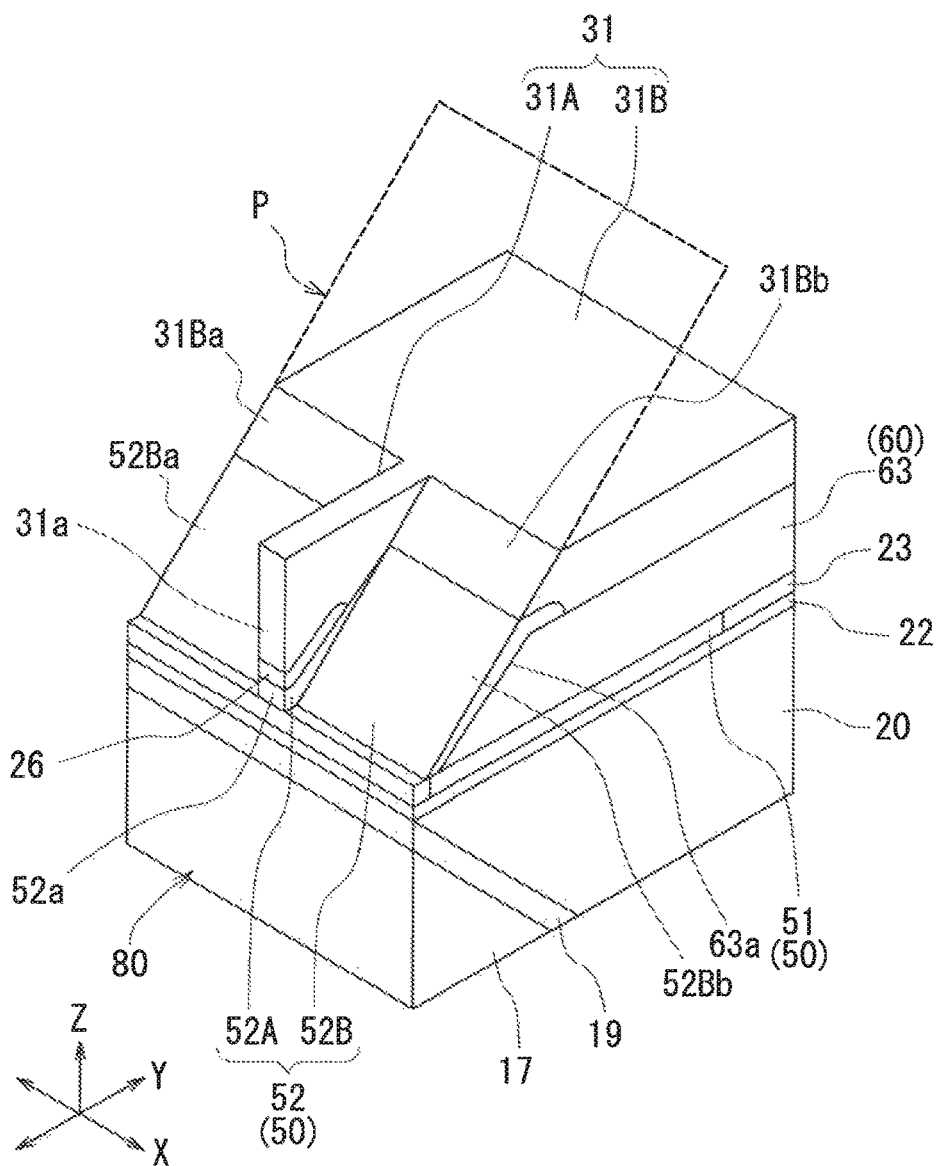
FIG. 23 is a perspective view showing the main part of a thermally-assisted magnetic recording head of a modification example of the first embodiment of the invention.

A modification example of the thermally-assisted magnetic recording head according to the present embodiment will now be described. FIG. 23 is a perspective view showing the main part of the thermally-assisted magnetic recording head of the modification example. In this modification example, the imaginary plane P including the first to fourth end faces 31Ba, 31Bb, 52Ba and 52Bb does not include the inclined surface 63a of the third portion 63 of the heat sink 60.

For the thermally-assisted magnetic recording head of the modification example, in the step shown in FIGS. 14A to 14C, the magnetic layer 31P, the initial dielectric layer 26P and the initial plasmon generator layer 52P are taper-etched such that the inclined surface 63a is not exposed.

Second Embodiment

Figure 24:
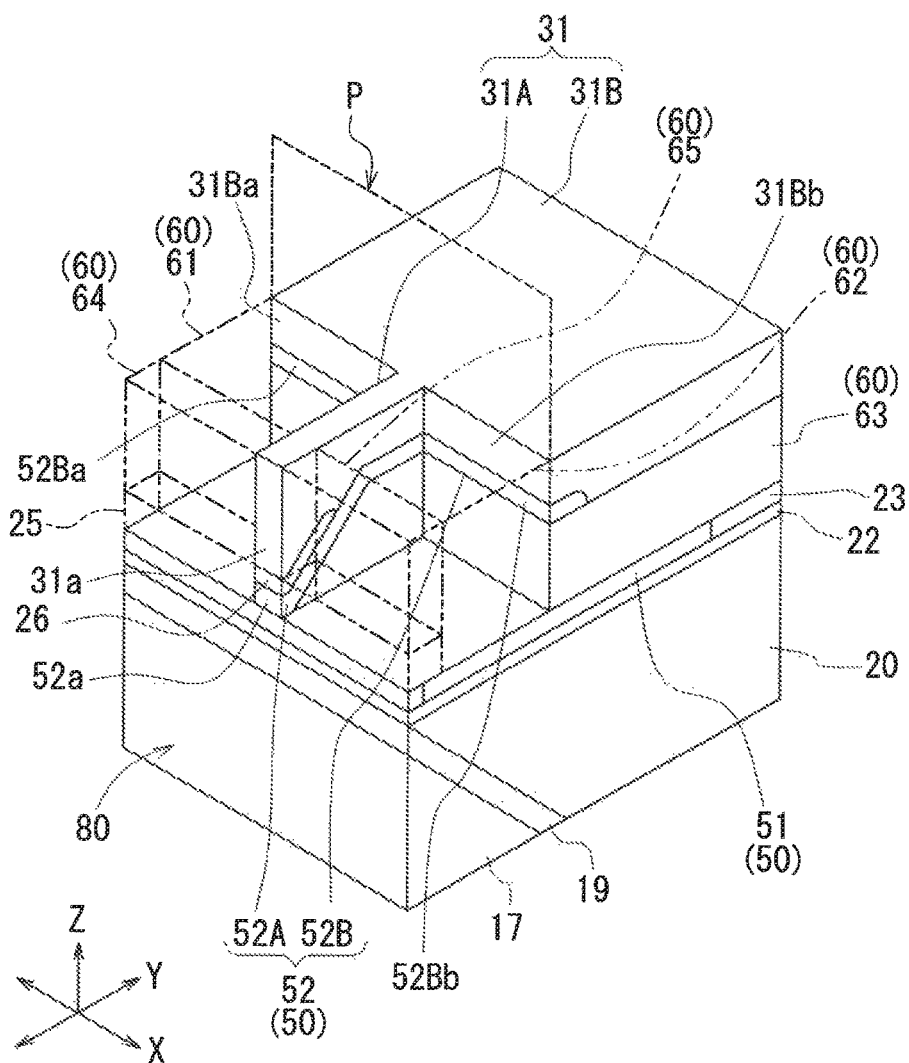
FIG. 24 is a perspective view showing the main part of a thermally-assisted magnetic recording head according to a second embodiment of the invention.
Figure 25:
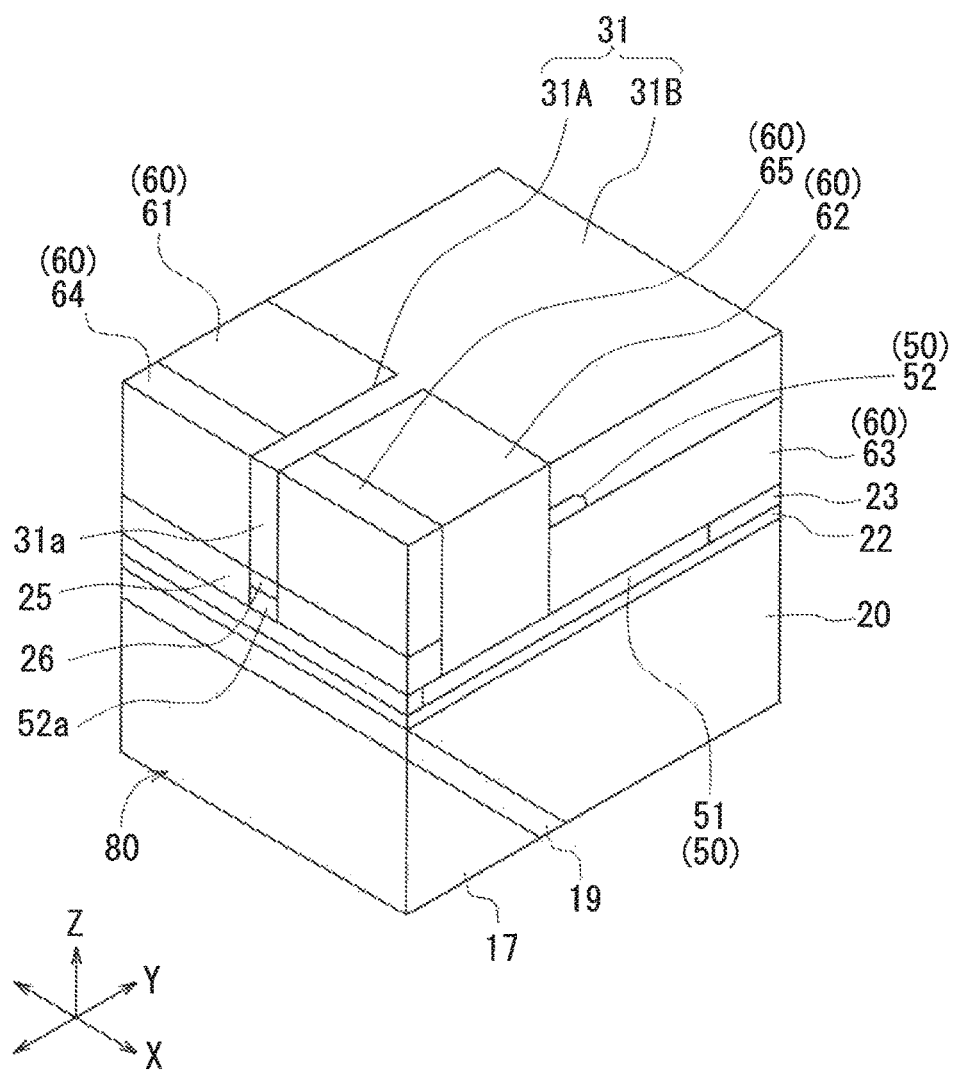
FIG. 25 is another perspective view showing the main part of the thermally-assisted magnetic recording head according to the second embodiment of the invention.

A second embodiment of the invention will now be described with reference to FIGS. 24 and 25. FIG. 24 is a perspective view showing the main part of a thermally-assisted magnetic recording head according to the present embodiment. FIG. 25 is another perspective view showing the main part of the thermally-assisted magnetic recording head according to the present embodiment.

In the present embodiment, the imaginary plane P including the first to fourth end faces 31Ba, 31Bb, 52Ba and 52Bb is substantially parallel to the medium facing surface 80.

In the manufacturing method for the thermally-assisted magnetic recording head according to the present embodiment, in the step shown in FIGS. 14A to 14C, the magnetic layer 31P, the initial dielectric layer 26P and the initial plasmon generator layer 52P are etched such that the first to fourth end faces 31Ba, 31Bb, 52Ba and 52Bb become substantially parallel to the medium facing surface 80.

The remainder of configuration, function and effects of the present embodiment are similar to those of the first embodiment.

The present invention is not limited to the foregoing embodiments, and various modifications may be made thereto. For example, as far as the requirements of the appended claims are met, the shapes and materials of the main pole 30, the plasmon generator 50 and the heat sink 60 can be freely chosen without being limited to the examples illustrated in the foregoing embodiments.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A thermally-assisted magnetic recording head comprising:
   a medium facing surface configured to face a recording medium;

a main pole having a front end face located in the medium facing surface;

a waveguide including a core and a cladding, the core allowing light to propagate therethrough, the cladding being provided around the core;

a plasmon generator having a near-field light generating surface located in the medium facing surface, the plasmon generator being configured to excite thereon a surface plasmon resulting from the light propagating through the core, and to generate near-field light from the surface plasmon at the near-field light generating surface; and a heat sink, wherein the main pole includes a first narrow portion including the front end face, and a first wide portion which is located farther from the medium facing surface than is the first narrow portion and is greater than the first narrow portion in dimension in a first direction, the first direction corresponding to the direction of track width, the plasmon generator includes a second narrow portion including the near-field light generating surface, and a second wide portion which is located farther from the medium facing surface than is the second narrow portion and is greater than the second narrow portion in dimension in the first direction, the front end face and the near-field light generating surface are adjacent to each other along a second direction, the second direction corresponding to the direction of track length, the first narrow portion has a first side surface and a second side surface opposite to each other in the first direction, the second narrow portion has a third side surface and a fourth side surface opposite to each other in the first direction, the heat sink includes a first portion adjacent to the first side surface and the third side surface, and a second portion adjacent to the second side surface and the fourth side surface, each of the first and second portions is higher in thermal conductivity than the second narrow portion, and each of the first and second portions is at a distance of 10 to 50 nm from the medium facing surface.

2. The thermally-assisted magnetic recording head according to claim 1, wherein the front end face has a first edge and a second edge opposite to each other in the first direction, the near-field light generating surface has a third edge and a fourth edge opposite to each other in the first direction, the first edge and the third edge are located on a first imaginary straight line extending in the second direction, and the second edge and the fourth edge are located on a second imaginary straight line extending in the second direction.

3. The thermally-assisted magnetic recording head according to claim 1, wherein the heat sink further includes a third portion located on a side of the second narrow portion opposite from the first narrow portion, and adjacent to the second narrow portion, the third portion is higher in thermal conductivity than the second narrow portion, and the third portion is at a distance of 10 to 50 nm from the medium facing surface.

4. The thermally-assisted magnetic recording head according to claim 3, wherein the third portion has an inclined surface facing toward the second narrow portion and the medium facing surface, and at least part of the second narrow portion extends along the inclined surface.

5. The thermally-assisted magnetic recording head according to claim 4, wherein the first narrow portion has a first proximal end which is a boundary with the first wide portion, the first wide portion has a first end face and a second end face facing toward the medium facing surface, the first proximal end is located between the first end face and the second end face, the second narrow portion has a second proximal end which is a boundary with the second wide portion, the second wide portion has a third end face and a fourth end face facing toward the medium facing surface, and the second proximal end is located between the third end face and the fourth end face.

6. The thermally-assisted magnetic recording head according to claim 5, wherein the first to fourth end faces are located in one imaginary plane.

7. The thermally-assisted magnetic recording head according to claim 6, wherein the one imaginary plane is inclined with respect to the medium facing surface.

8. The thermally-assisted magnetic recording head according to claim 6, wherein the one imaginary plane is substantially parallel to the medium facing surface.

9. The thermally-assisted magnetic recording head according to claim 3, wherein the plasmon generator further includes an excitation portion located away from the medium facing surface, the excitation portion includes a plasmon exciting portion configured to excite the surface plasmon thereon, and part of the third portion of the heat sink is interposed between the excitation portion and the second narrow portion.

10. The thermally-assisted magnetic recording head according to claim 1, wherein the heat sink further includes a fourth portion and a fifth portion, the fourth portion is located between the medium facing surface and the first portion and adjacent to the first side surface, and the fifth portion is located between the medium facing surface and the second portion and adjacent to the second side surface.

11. The thermally-assisted magnetic recording head according to claim 10, wherein the fourth portion is higher in Vickers hardness than the first portion, and the fifth portion is higher in Vickers hardness than the second portion.

12. The thermally-assisted magnetic recording head according to claim 1, wherein the main pole further includes a third wide portion located on a side of the first narrow portion opposite from the second narrow portion and configured to be magnetically coupled to the first narrow portion, and the third wide portion is greater than the first narrow portion in dimension in the first direction.

13. A manufacturing method for the thermally-assisted magnetic recording head of claim 1, comprising the steps of:

forming the waveguide;

forming the plasmon generator and the main pole; and forming the heat sink, wherein
the step of forming the plasmon generator and the main pole includes the steps of:
  forming an initial plasmon generator layer;
  patterning the initial plasmon generator layer to provide the initial plasmon generator layer with the second narrow portion and the second wide portion;
  forming a magnetic layer; and
  patterning the magnetic layer to provide the magnetic layer with the first narrow portion and the first wide portion, and
the step of forming the heat sink includes the step of forming the first portion and the second portion after the magnetic layer and the initial plasmon generator layer have been patterned.

14. The manufacturing method for the thermally-assisted magnetic recording head according to claim 13, wherein
the front end face has a first edge and a second edge opposite to each other in the first direction,
the near-field light generating surface has a third edge and a fourth edge opposite to each other in the first direction,
the first edge and the third edge are located on a first imaginary straight line extending in the second direction,
the second edge and the fourth edge are located on a second imaginary straight line extending in the second direction,
the magnetic layer is formed after the formation of the initial plasmon generator layer, and
the step of patterning the initial plasmon generator layer and the step of patterning the magnetic layer are performed at the same time.

15. The manufacturing method for the thermally-assisted magnetic recording head according to claim 13, wherein
the heat sink further includes a third portion located on a side of the second narrow portion opposite from the first narrow portion, and adjacent to the second narrow portion,
the third portion is higher in thermal conductivity than the second narrow portion,
the third portion is at a distance of 10 to 50 nm from the medium facing surface, and
the step of forming the heat sink further includes the step of forming the third portion before the step of forming the initial plasmon generator layer.

16. The manufacturing method for the thermally-assisted magnetic recording head according to claim 15, wherein
the third portion has an inclined surface facing toward the second narrow portion and the medium facing surface, and
at least part of the initial plasmon generator layer is formed on the inclined surface.

17. The manufacturing method for the thermally-assisted magnetic recording head according to claim 15, wherein
the plasmon generator further includes an excitation portion located away from the medium facing surface,
the excitation portion includes a plasmon exciting portion configured to excite a surface plasmon thereon,
part of the third portion of the heat sink is interposed between the excitation portion and the second narrow portion, and
the step of forming the plasmon generator and the main pole further includes the step of forming the excitation portion before the step of forming the third portion.

18. The manufacturing method for the thermally-assisted magnetic recording head according to claim 13, wherein
the heat sink further includes a fourth portion and a fifth portion,
the fourth portion is located between the medium facing surface and the first portion and adjacent to the first side surface,
the fifth portion is located between the medium facing surface and the second portion and adjacent to the second side surface, and
the step of forming the heat sink further includes the step of forming the fourth portion and the fifth portion after the step of forming the first portion and the second portion.

* * * * *